United States Patent [19]

Sakata et al.

[11] Patent Number: 4,495,703
[45] Date of Patent: Jan. 29, 1985

[54] COORDINATE MEASURING INSTRUMENT

[75] Inventors: Hideo Sakata; Masami Saito, both of Kawasaki, Japan

[73] Assignee: Mitutoyo Mfg. Co., Ltd., Tokyo, Japan

[21] Appl. No.: 441,149

[22] Filed: Nov. 12, 1982

[30] Foreign Application Priority Data

| Nov. 25, 1981 | [JP] | Japan | 56-188926 |
| Nov. 25, 1981 | [JP] | Japan | 56-188927 |
| Nov. 25, 1981 | [JP] | Japan | 56-188928 |
| Nov. 25, 1981 | [JP] | Japan | 56-188929 |
| Nov. 25, 1981 | [JP] | Japan | 56-188930 |
| Nov. 25, 1981 | [JP] | Japan | 56-188931 |
| Nov. 25, 1981 | [JP] | Japan | 56-188932 |
| Nov. 25, 1981 | [JP] | Japan | 56-188933 |
| Nov. 25, 1981 | [JP] | Japan | 56-188934 |
| Nov. 25, 1981 | [JP] | Japan | 56-188935 |
| Nov. 25, 1981 | [JP] | Japan | 56-175011[U] |

[51] Int. Cl.³ .............................................. G01B 7/03
[52] U.S. Cl. ................................... 33/174 L; 33/1 M
[58] Field of Search ............... 33/1 M, 169 R, 172 E, 33/174 L, 174 P

[56] References Cited

U.S. PATENT DOCUMENTS

| 3,239,941 | 3/1966 | Ahmer | 33/1 M |
| 3,403,448 | 10/1968 | Aller | 33/174 L |
| 3,509,635 | 5/1970 | Meinke | 33/174 L |
| 3,749,501 | 7/1973 | Wieg | 33/1 M |
| 3,813,789 | 6/1974 | Shelton | 33/174 L |
| 3,840,993 | 10/1974 | Shelton | 33/1 M |
| 4,138,822 | 2/1979 | Parodi | 33/174 L |
| 4,168,576 | 9/1979 | McMurtry | 33/174 L |
| 4,305,207 | 12/1981 | Lantz | 33/1 M |

FOREIGN PATENT DOCUMENTS

| 861779 | 1/1971 | Canada | 33/1 M |
| 2736145 | 2/1979 | Fed. Rep. of Germany | 33/1 M |

Primary Examiner—Richard R. Stearns
Attorney, Agent, or Firm—Flynn, Thiel, Boutell & Tanis

[57] ABSTRACT

A coordinate measuring instrument wherein a measuring element is supported through a measuring element support member in a manner to be displaceable relative to the upper surface of a bedplate in directions of X, Y and Z axes perpendicularly intersecting one another, and a shape and the like of a workpiece to be measured are measured from displacements of the measuring element. This coordinate measuring instrument is provided with a guide rail projecting from one side of the bedplate, for guiding the measuring element support member in the direction of the Y axis and the upper surface of this guide rail is disposed in parallel to the upper surface of the bedplate.

18 Claims, 31 Drawing Figures

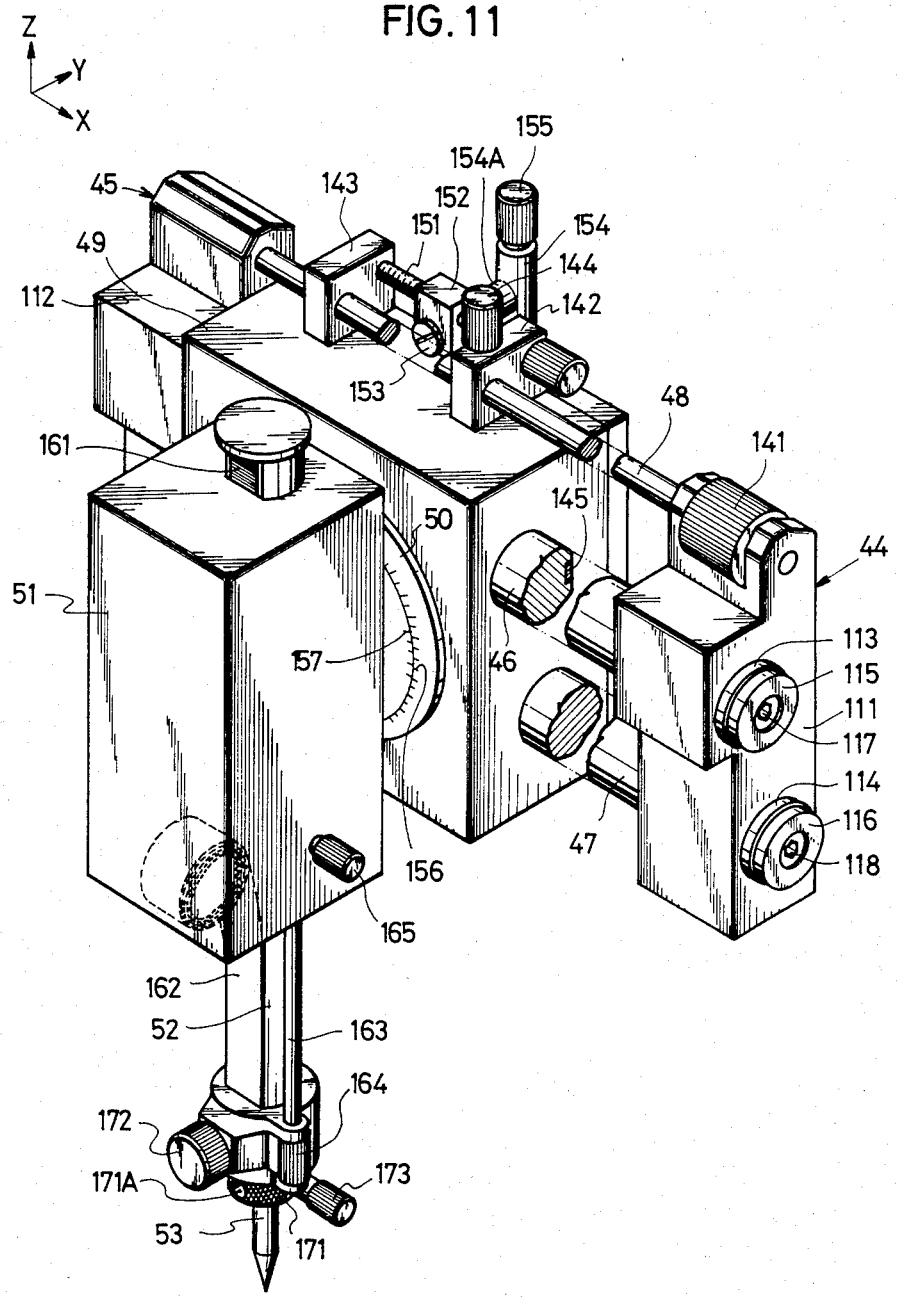

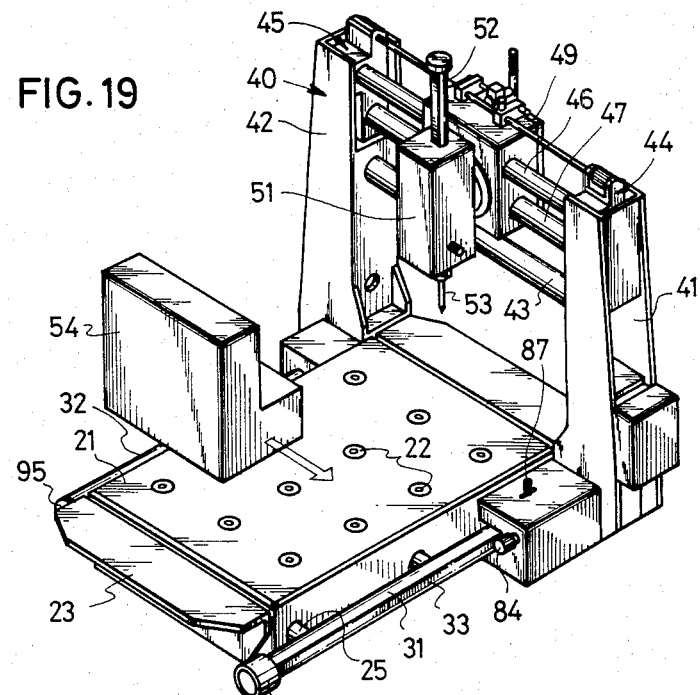

COORDINATE MEASURING INSTRUMENT

BACKGROUND OF THE INVENTION

1. Field of the Invention

This invention relates to a coordinate measuring instrument wherein a shape and the like of a workpiece to be measured are measured from displacements of a measuring element made displaceable, with respect to the workpiece rested on a bedplate, in directions of axes of X, Y and Z perpendicularly intersecting one another.

2. Description of the Prior Art

Heretofore, there has been known a coordinate measuring instrument wherein a measuring element is brought into abutting contact with the surface of a workpiece and a shape and the like of the workpiece are measured from displacements of the measuring element. The measuring instrument of the type described is capable of measuring the workpiece with high accuracies, and hence, is utilized in all fields of industries.

FIGS. 1 and 2 show the appearances of the coordinate measuring instruments which have been commonly used and are different in type from each other. Referring to FIG. 1, a supporting structure 1 comprises a base 2 and a surface plate 3 as being a bedplate disposed on this base 2, and a gate-shaped measuring element support member 4 is supported on this surface plate 3 through bearings 5 and 6 in a manner to be movable in a direction of the Y axis (longitidinal direction). Provided between the surface plate 3 and the measuring element support member 4 is a Y axis direction displacement detector 7 consisting of an optical displacement detector and the like, which can automatically detect a displacement of the support member 4 in the direction of a Y axis.

The measuring element support member 4 includes a transverse member 8, and a slider 9 is supported on this transverse member 8 in a manner to be movable in a direction of an X axis (lateral direction). Provided between this slider 9 and the transverse member 8 is an X axis direction displacement detector 10 consisting of an optical displacement detector and the like, which can automatically detect a displacement of the slider 9 in the direction of the X axis. The slider 9 is provided with a prismatic spindle 11 in a manner to be movable in a direction of a Z axis (vertical direction), and a measuring element 12 is provided at the bottom end of this spindle 11. Further, provided between this spindle 11 and the slider 9 is a Z axis direction displacement detector 13 consisting of an optical displacement detector and the like, which can automatically detect a displacement of the spindle 11 in a direction of a Z axis.

In the coordinate measuring instrument shown in FIG. 2, a supporting structure 1 comprises a base 2, a surface plate 3 disposed on the base 2 and supports 14, 15 erected from opposite sides of the upper surface of this surface plate 3. A measuring element support member 4 consisting of a transverse member 8 is provided on these supports 14 and 15 in a manner to be movable in the direction of the Y axis through air bearings 5 and 6, and other respects of construction are identical with those of the construction of the coordinate measuring instrument shown in FIG. 1.

Being seized with the idea that rugged construction having no portions to be adjusted can secure high accuracies, in the conventional coordinate measuring instrument of the type described the positional reference of construction of the measuring instrument is sought on the upper surface of the surface plate 3, the support portions of the measuring element support member 4 or the supports 14 and 15 are precisely uprightly erected on this surface plate 3, a transverse member 8 is precisely horizontally racked across these support portions or the supports 14 and 15, a movable slider 9 is provided on this transverse member 8 in such a manner that a spindle 11 supported by this slider 9 can be disposed precisely vertically and so forth. Thus, the conventional coordinate measuring instrument has been constructed such that, the various portions are successively built up while being adjusted on the basis of the surface plate 3. Furthermore, the support portions or the supports 14 and 15 of the measuring instrument support member 4 should bear the weights of the transverse member 8, the slider 9 and so forth, and hence, the shapes of the leg portions should necessarily be rendered large-sized.

For this reason, in the conventional construction the portion occupied by the leg portions is large, and hence, the effective area usable for the measuring is reduced, and the effective height is limited by the heights of the supports. With the construction shown in FIG. 2, linear movement of the workpiece to be measured to and from the upper surface of the surface plate 3 is performed with difficulties to a considerable extent owing to the presence of the fixed supports 14 and 15, and a workpiece larger than the span across the supports cannot be mounted on the surface plate 3. Thus, such a disadvantage has been presented that the scope of measuring capacity is very small for the large size of the measuring instrument.

Furthermore, with the method of successively building up the various portions after they are adjusted, when it is found that the accuracy is low after the final assembling, it is not known what portion is to be adjusted. Thus, such a disadvantage has been presented that all of the adjustments and assemblings should be repeated from the beginning. In consequence, in the conventional construction, the accuracy of finishing of one of the parts affects the overall accuracy to a great extent, and any deviation in adjustment or the like in the initial stage cannot be corrected or improved, thus resulting in doing all the adjustment and assembling by lapping over from the beginning. Since the overall accuracy depends upon the skill level of the operators in assembling to a considerable extent, the high skill level in working is required from the operators, and moreover, since parts finished with high accuracy must be used, the cost of manufacture is increased to a considerable extent. Further, since such a method is adopted that the various portions are successively built up, it becomes difficult to assemble the products at the site, which leads to inconvenient transportation of the products and so forth, thus resulting in cumbersome handling of the conventional coordinate measuring instrument.

Since the conventional coordinate measuring instrument is of such an arrangement that displacements of the measuring element are to be measured as referenced from the upper surface of the bedplate, it is necessary to move the measuring element support member supporting the measuring element in parallel to the upper surface of the bedplate.

In view of the above, heretofore, guide rails finished with high accuracy have been directly affixed to the upper surface of the bedplate in parallel to each other by means of fittings for exclusive use with bolts. In consequence, there have been presented such disadvantages that a great amount of labor is needed for the installation of the guide rails, out of the area of the upper surface of the bedplate the effective portion put to use for resting a workpiece to be measured is small, and a workpiece of heavy weight cannot be parallelly moved from one side of the bedplate to be rested thereon.

On the other hand, there are some cases where, for example, the guide rails are suspended from the ceiling of a house, or the guide rails are disposed on the ground through a bed in no connection with the bedplate. In this case, a great amount of labor is needed for obtaining parallelism between the upper surface of the bedplate and these guide rails, and moreover, anti-vibration measures for the guide rails must be taken, thus resulting in increased costs and lowered accuracy.

Further, in the conventional coordinate measuring instrument, a stopper is provided between the guide rails and the measuring element support member to prevent the measuring element support member from falling off the guide rails.

However, since the stopper is affixed to the guide rails or the like, when the measuring element support member abuts against the stopper and is stopped thereat, the measuring element support member is deflected, deformed and so forth, thus resulting in lowered measuring accuracy.

Now, in the measuring instrument of the type described wherein an accuracy as high as in $\mu$m order is required, it is an essential requirement to prevent the structure of the measuring instrument support member and the like from being deformed. Heretofore, it has been admitted that there is little possibility that the measuring instrument support member abuts against the stopper disposed at the outer-most position in the scope of measuring capacity to thereby be deformed and so forth. Consequently, the above-described design has been adopted.

However, practical operations are concentratedly based on the relations between the workpiece to be measured and the measuring element, and hence, the measuring element support member often reaches the limited portion of the scope of movement. Moreover, the portions of the measuring element support member are very smoothly movable, and hence, often abut against the stopper. In consequence, there has been presented the disadvantage that the measuring element support member is progressively deformed, resulting in lowered measuring accuracy.

Furthermore, in the conventional coordinate measuring instrument, there are used measuring elements having various forward ends different from one another in accordance with the purposes of use. In the mounting constructions, in each of which one of the measuring elements of the type described is mounted to a spindle having a mounting portion for the measuring element of the type described, the shapes of shank portions of all the measuring elements are made identical with one another in measuring instruments of a given type, and round holes meeting the shapes of the shank portions are penetratingly provided in the mounting portions of the measuring elements of the spindles, and engagements therebetween are effected.

Therefore, heretofore, it has been necessary to prepare various measuring elements having forward ends different from one another for different measuring instruments, thus resulting in an extreme inconvenience in use.

As described above, normally, the shapes of the shank portions of the measuring elements in the measuring instruments of the same type are made identical with each other, however, there are cases where the identical shapes cannot be adopted depending upon the purposes of use. More specifically, in performing marking-off works by use of the measuring element, an appreciable value of load acts on the measuring element unlike an ordinary contact, and so it is preferable to make the shank portion larger in diameter than an ordinary one. Further, this is true of the case where a measuring element by far longer than an ordinary one is used.

However, heretofore, in order to make the shank larger than an ordinary one, it has been necessary to change the shape of the spindle. However, the fact is that the operators have been using the conventional measuring elements as they are, enduring inconvenience.

Further, in the conventional measuring instrument of the type described, there has been known a so-called universal probe (measuring element) in which the forward end portion is made tiltable with respect to the main body portion thereof. This measuring element is secured to a Z axis spindle through its shank portion integrally formed on the main body portion thereof, and the forward end portion thereof is tiltable with respect to the axial direction of the spindle.

However, the conventional measuring element can be brought into contact with the inner wall of a hole formed in an inclined surface, and the spindle itself is not tilted, but moved only in the direction of the Z axis, i.e., the vertical direction, and hence, processing of the measured value in accordance with the contact of the measuring element should be strictly performed three-dimentionally, thus requiring calculations.

Therefore, necessity has been voiced for a coordinate measuring instrument wherein a depth of a hole formed in an inclined surface and the like are processed one-dimentionally without requiring calculations.

Furthermore, in the conventional measuring instrument of the type described, from the necessity for performing measurement in a condition where the workpiece to be measured and the measuring element are moved relative to each other, there are provided various guide rails and an engageable block movable along these guide rails. In this case, in the measuring instrument for performing precision measurement and requiring a high speed measurement such as a coordinate measuring instrument, there has been developed a device wherein the guide rails and the engageable block are finely fed during precision measurment and freely, manually transferred, releasing this fine feed during high speed movement.

Heretofore, the fine feed device of the type described, as disclosed in Japanese Patent Kokai(Laid-Open) No. 10759/74, comprises a feed screw, a half nut openably, threadably coupled to this feed screw and an arm holding this half nut and opening or closing the half nut, and, free feed and fine feed can be performed in accordance with the opening or closing operation of this arm.

However, the conventional device as described above presents such disadvantages that the construction is complicated and expensive, and, when the half nut is mistakenly closed during free feed, the main parts such as the feed screw and the like are damaged.

SUMMARY OF THE INVENTION

An object of the present invention is to provide a coordinate measuring instrument wherein the usable area of a bedplate consisting of a surface plate or the like is by far larger than that in a conventional measuring instrument.

The present invention has been developed as based on the utilization of the side surfaces of the bedplate which has been overlooked because of being possibly lower in accuracy such as flatness than the upper surface of the bedplate. To achieve the above-described object, the present invention comtemplates that, at one side of the bedplate, a guide rail is provided in parallel to the upper surface of the bedplate and projected from the bedplate, a measuring element support member is provided in a manner to be movable along this guide rail, and a positional reference of this measuring element support member is set on this guide rail, whereby any obstacle on the bedplate at least at the side where this guide rail is provided is removed.

Another object of the present invention is to provide a coordinate measuring instrument wherein a guide rail is provided which can readily obtain parallelism between the upper surface of a bedplate and the guide rail through a small amount of labor.

To achieve the above-described object, the present invention contemplates that this guide rail is fixed to a side surface of the bedplate by use of a bonding agent directly or through an intermediate member, and, in this case, the fixing is effected by means of a jig in such a manner that the axis of the guide rail is in parallel to the upper surface of the bedplate.

A further object of the present invention is to provide a coordinate measuring instrument wherein, even if the measuring element support member comes to the limit of the scope of movement, no adverse effect is given to the measuring element support member.

To achieve the above-described object, the present invention contemplates that a guide rail is provided at the side surface of a bedplate onto which a workpiece to be measured is mounted, shock absorbers are provided at opposite end portions of this guide rail, and each of the shock absorbers includes a movable member being movable along the guide rail, and a shock absorbing means consisting of a spring or the like is provided between this movable member and the guide rail, whereby, even if a measuring element support member movable on the guide rail abuts against the shock absorber, the resultant shock can be absorbed by the shock absorbing means, thereby enabling to avoid giving an adverse effect to the measuring element support member.

A still further object of the present invention is to provide a coordinate measuring instrument wherein such a mounting construction is provided that, even if the shapes of a measuring element including a largeness in diameter, largeness in size and the like are changed, the measuring element can be mounted to the spindle without requiring to change a spindle in its shape.

To achieve the above-described object, the present invention contemplates that a movable spindle is formed with a measuring element mounting portion having a cylindrical hollow part, a measuring element is mounted in this measuring element mounting portion not directly but through a detachable adapter, i.e., a measuring element mounting bush, and the measuring element mounting bush is replaced as necessary, so that measuring elements different in largeness in diameter and the like can be mounted.

A yet further object of the present invention is to provide a coordinate measuring instrument which can be easily assembled, adjusted, and moreover, inexpensive.

To achieve the above-described object, the present invention is based on that, in these measuring instruments, in the last analysis, it suffices that the measuring element moves accurately in directions of X, Y and Z axes, without being seized by the conventional idea. After the structure is assembled, a precision measurment is performed by directly using the measuring element, and, based on the result thus obtained, if any error in accuracy is found, adjustments in the directions of the X, Y and Z axes are made at one portion without touching the construction as a whole. An adjusting means capable of displacing the measuring element in the directions of the X, Y and Z axes is provided at a connecting portion between a slider guide rail racked across a pair of supports erected on a bedplate and at least one of the pair of supports, whereby adjustment of accuracy is effected by this adjusting means, thereby enabling to achieve the above-described object.

To better achieve the above-described object, the present invention contemplates that a transverse member for setting an interval across a pair of supports in a direction of X axis to a predetermined distance is fixed above an upper limit position of movement of the bottom end of a measuring element, whereby a function of setting the distance across the pair of supports and a function of guiding a slider are divided into two, which would otherwise be integrally formed into a unitary structure as in the prior art, i.e., including a transverse member and a slider guide rail, so that adjustment of the slider guide rail is made possible. Moreover, the supports are referenced from only one of guide rails disposed at opposite sides in a direction of Y axis, whereby engagement of the supports with the other of the guide rails is made free, so that assembling is facilitated, and prevention of engagement from being released, which would be caused by the aforesaid free engagement, is effected by the transverse member for setting the distance.

A further object of the present invention is to provide a coordinate measuring instrument capable of measuring a depth, diameter or the like of a hole formed in an inclined surface as a one-dimentional movement, i.e., a movement of only a spindle holding a measuring element.

To achieve the above-described object, the present invention contemplates that a slider is slidably mounted to a slider guide rail racked across supports of a measuring element support member upwardly of a bedplate, a spindle support member is rotatably mounted to this slider, a spindle having a measuring element is supported by this spindle support member in a manner to be movable along the axial direction thereof, the rotary axis of rotation of the spindle support member is a direction perpendicular to both the moving direction of the slider and the moving direction of the spindle, i.e., a direction perpendicularly intersecting a plane incorporating therein the moving direction of the slider and the moving direction of the spindle, whereby the moving direction of the spindle can be inclined, so that this inclination can be set in parallel, perpendicular or the like to a surface to be measured.

A still further object of the present invention is to provide a coordinate measuring instrument wherein the spindle support member, which can be inclined, can be precisely positioned with a simplified construction, and a positioning device is provided out of the way of the moving spindle support member when positioning is released.

To achieve the above-described object, the present invention contemplates that a first and a second members each having a screw portion and a tapered portion, which are engageable with each other, are respectively secured to either the slider or the spindle support member, which are movable relative to each other, so that a fixing action by the screw portion and a guiding action by the tapered portion cooperate in precision-positioning without requiring a force of a high value. Moreover, the provision of a releasing means for holding the first and the second members in separated state prevents the both members from abutting against each other during rotation of the slider.

A yet further object of the present invention is to provide a coordinate measuring instrument having a fine feed device being simplified in construction, manufactured at a low cost and easy in handling.

The present invention has been developed to be free from the conventional idea that a fine feed is released by a nut portion threadably coupled to a feed screw. To achieve the above-described object, the present invention contemplates that a frame is secured to an engageable block being movable relative to a guide rail through a fine feed means in a manner to be rotatable and movable relative to the guide rail in the longitudinal direction of the guide rail, this frame is provided with two crossbars opposed to each other in such a manner as if to clamp the guide rail from the radial directions thereof, an oscillating block is secured to a position of one of the crossbars opposed to the guide rail, a clamp member formed of a screw or the like is provided on this oscillating block in a manner to be linearly movable, this clamp member advances to clamp and fix the guide rail in cooperation with the other of the crossbars, and a fine feed means is operated in this fixed state, whereby fine feed is made possible. On the other hand, a biasing means formed of a sheet spring or the like for separating the other of the crossbars from the guide rail when the clamp member is retracted, to thereby secure free movement between the guide rail and the engageable member.

BRIEF DESCRIPTION OF THE DRAWINGS

FIG. 11 is an enlarged perspective view, partially cut away, showing the slider portion in the present embodiment;

FIGS. 19 through 24 are perspective views modes of use in the present embodiment, differing from one another;

BRIEF DESCRIPTION OF THE PREFERRED EMBODIMENTS

Description will hereunder be given of one embodiment, in which the present invention is applied to a coordinate measuring instrument, with reference to FIGS. 3 through 17.

Figure 1:
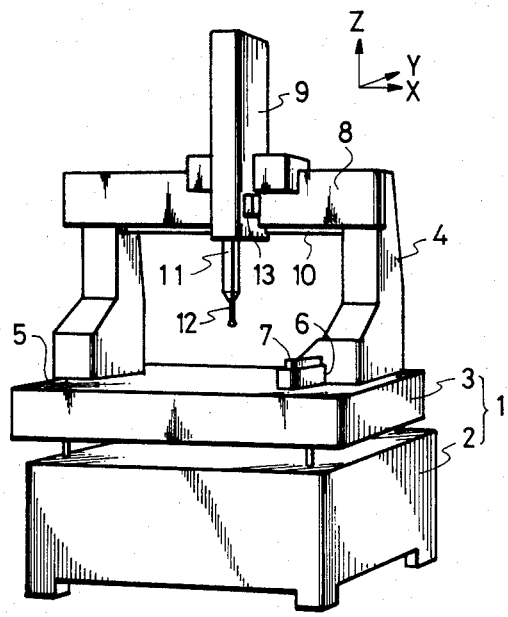
FIGS. 1 and 2 are perspective views respectively showing examples of the conventional coordinate measuring instruments different from each other.
Figure 2:
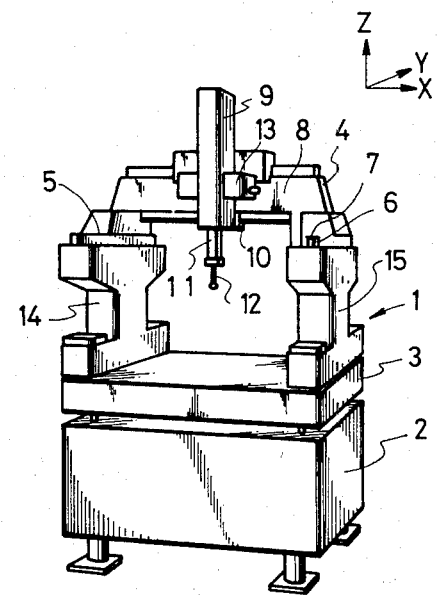
Figure 3:
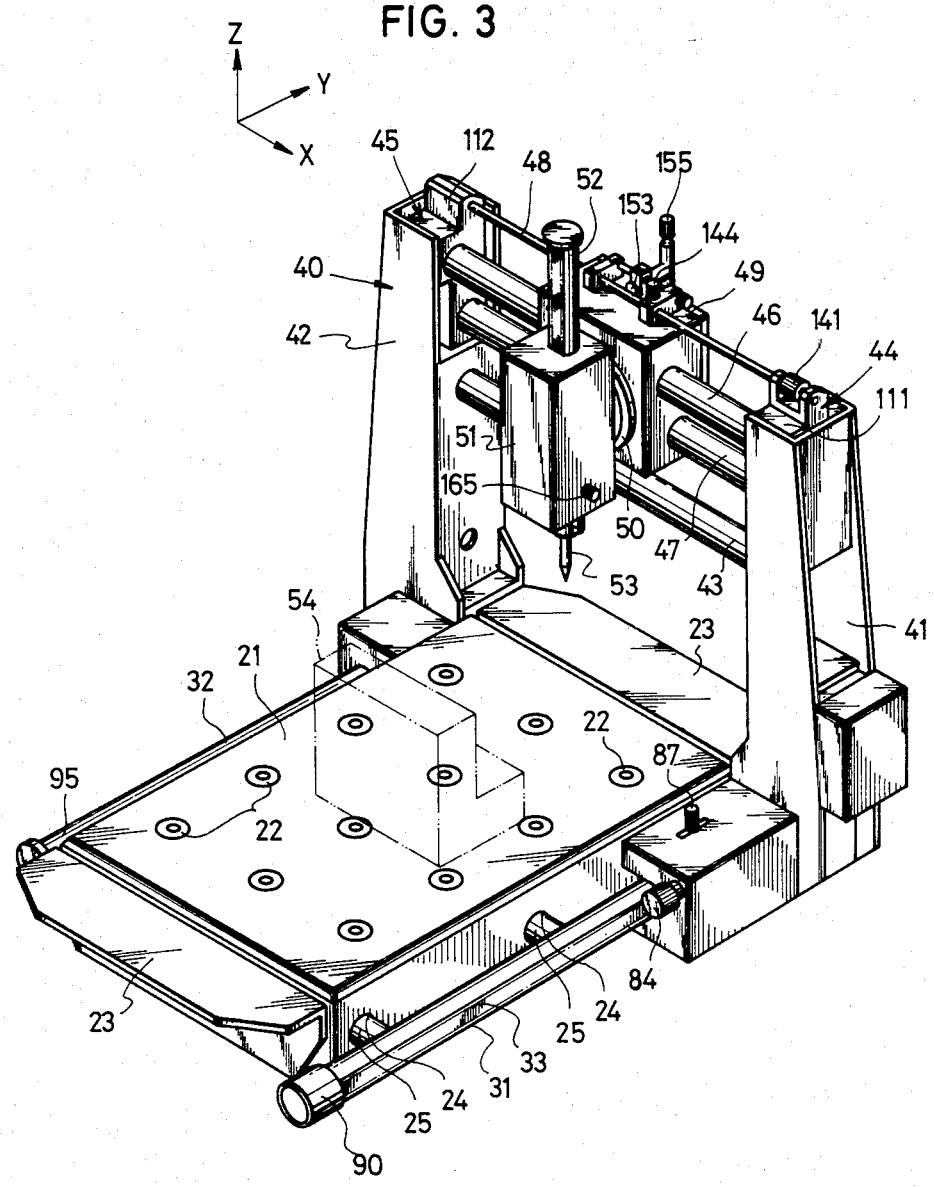
FIG. 3 is a perspective view showing one embodiment in which the present invention is applied to a coordinate measuring instrument.

In a general arrangement view shown in FIG. 3, a bedplate 21 formed of a stone surface plate of substantially a rectangular parallelepiped is formed at the upper surface thereof with a plurality of threaded holes 22 for mounting a workpiece to be measured and further is provided at front and rear end faces perpendicularly intersecting the longidutinal direction thereof with handgrips 23 of L-shape in cross-section, respectively. This bedplate 21 is detachably provided at opposite side surfaces thereof with guide rails 31 and 32, respectively, constituting guiding portions in directions of the Y axis. These guide rails 31 and 32 are longer than the length in the longitudinal direction (direction of the Y axis) of the bedplate 21 (Refer to FIG. 4), disposed below the upper surface of the bedplate 21 and in parallel therewith, and projected from the side surfaces of the bedplate 21. In this case, the provision of the guide rails 31 and 32 below the upper surface of the bedplate 21 means that the top surfaces of the guide rails 31 and 32 are flush with or lower than the upper surface of the bedplate 21. Furthermore, both the guide rails 31 and 32 are each formed such that opposite sides of a column are ground away in parallel to each other and the shape of a cross-section of the column perpendicularly intersecting the longitudinal direction of the column is formed into substantially an oval shape consisting of circular arcuate portions and rectilinear portions (Refer to FIG. 6). Further, one of the guide rails, i.e., the guide rail 31 shown in front in FIG. 3 is adhesively attached at the outer side surface thereof with a long scale 33 to be described in detail hereunder.

Prismatic supports 41 and 42 are supported by the guide rails 31 and 32 disposed at the opposite sides in a manner to be movable in the longitudinal direction (direction of the Y axis) of the guide rails 31 and 32, respectively. Racked across the intermediate portions of these supports 41 and 42 disposed at the opposite sides is a transverse member 43 formed of a round rod for setting an interval across the both supports 41 and 42 in the direction of the X axis to a predetermined value. Further, racked across the upper end portions of the both supports 41 and 42 through connecting portions 44 and 45, respectively, are slider guide rails 46 and 47 formed of round rods and a slider fine feed rail 48 formed of a round rod in a manner to perpendicularly intersect the aforesaid guide rails 31 and 32 and be in a direction parallel to the upper surface of the bedplate 21, i.e., the direction of the X axis. A box-shaped slider 49 is supported on these slider guide rails 46 and 47 in a manner to be movable in the direction of the X axis along the slider guide rails 46 and 47. A box-shaped spindle support member 51 is supported on this slider 49 through angle measuring means 50 in a manner to be tiltable about the Y axis. A spindle 52 is supported on this spindle support member 51 in a manner to be slidable in a direction of the center axis thereof. The spindle 52 is secured at the lower end thereof with a measuring element 53. In this case, the spindle 52 is set to be movable in a direction of the axis Z (vertical direction) when the inclination of the spindle support member 51 is zero, whereby the measuring element 53 is desirably movable relative to the bedplate 21 and a workpiece to be measured, which has been mounted on this bedplate 21, in the directions of the X, Y and Z axes perpendicularly intersecting one another in accordance with the movement of the slider 49 in the direction of the X axis and the movements of the supports 41 and 42 in the direction of the Y axis. Furthermore, a measuring element support member 40 is constituted by the supports 41 and 42, the transverse member 43, the connecting portions 44 and 45, the slider guide rails 46 and 47, the slider 49, the angle measuring means 50, the spindle support member 51 and the spindle 52.

Figure 5:
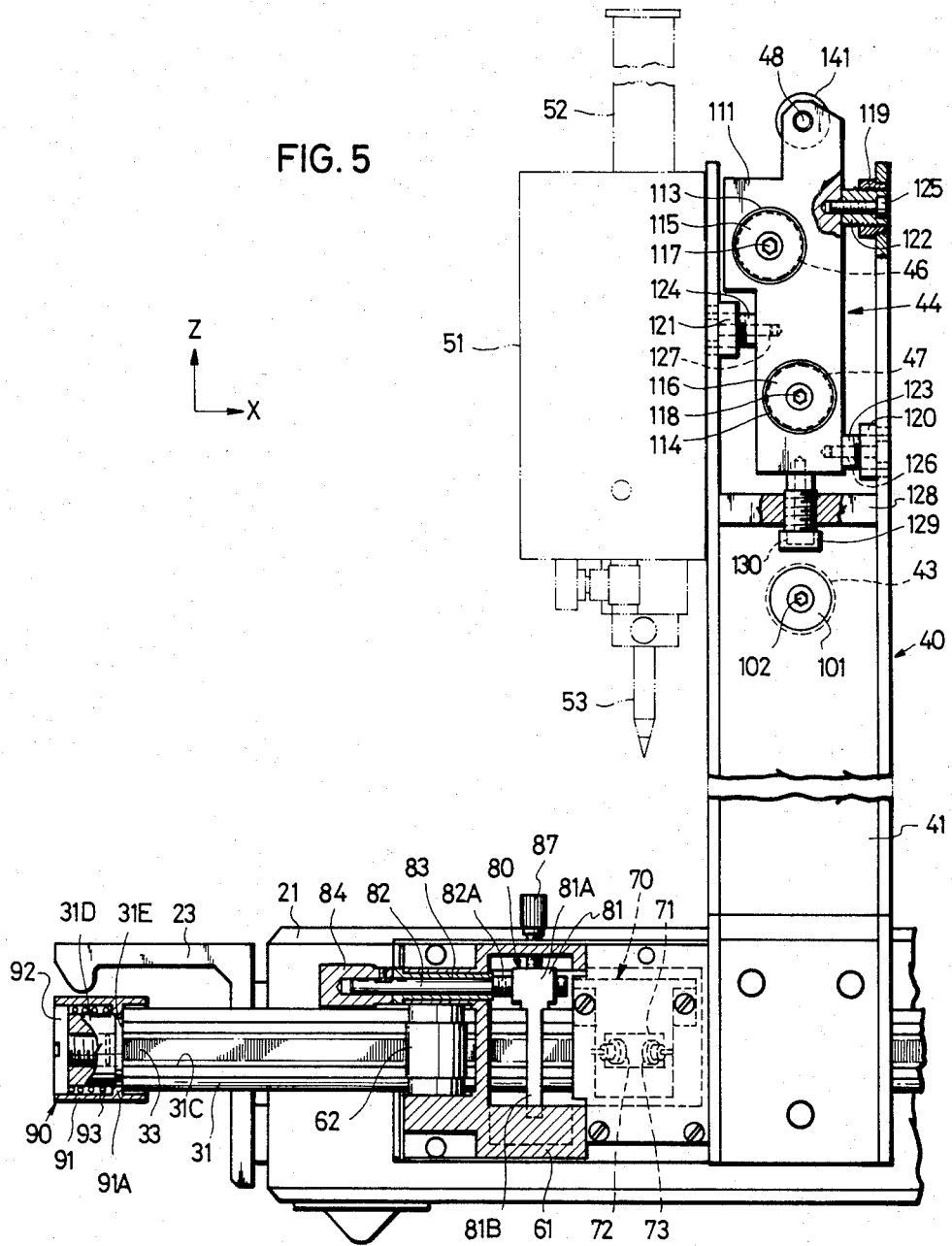
FIG. 5 is an enlarged side view, partially cut away, of the essential portions shown in FIG. 3.
Figure 6:
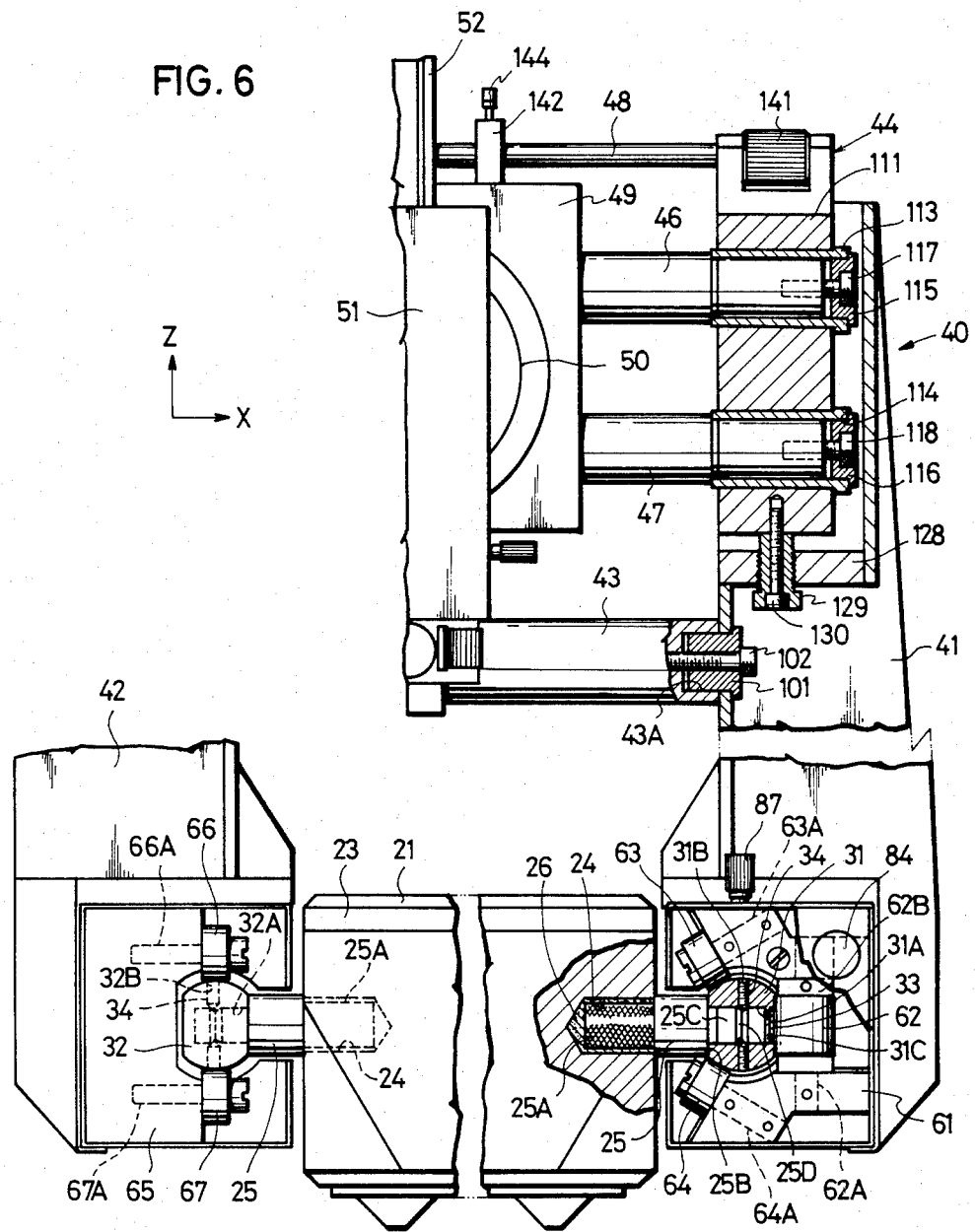
FIG. 6 is an enlarged front view thereof.

In FIGS. 5 and 6, i.e., the sectional views enlargedly showing the essential portions of the present embodiment, formed in series on the opposite side surfaces of the bedplate 21 in the direction of the Y axis are a plurality of holes 24 as being a recessed portion, into which small diameter portions 25A formed at end portions of support stems 25 constituting rail support portions are bonded and solidly secured through a bonding agent 26 (Refer to FIG. 6). In this case, irregularities are formed by means of double-cut knurling on the outer peripheries of the small diameter portions 25A, so that the bond strength can be improved. Furthermore, each of the support stems 25 is integrally formed at the other end thereof with a small diameter projection 25C through a stepped portion 25B. A V-groove 25D is formed around the entire periphery of the intermediate portion of this projection 25C.

Recesses 31A and 32A engageable with the projections 25C of the support stems 25 are formed on the inner side surfaces of the both guide rails 31 and 32 at positions respectively opposed to the plurality of support stems 25 projected from the opposite side surfaces of said bedplate 21. Pairs of threaded holes 31B and 32B penetrating to these recesses 31A and 32A are formed from the circular arcuate surfaces of the guide rails 31 and 32 being oval in cross-section at positions respectively opposed to the recesses 31A and 32A, and locking screws 34 having tapered forward end portions are threadably coupled into these threaded holes 31B and 32B, respectively. In this case, the center line of the V-groove 25D and the center axis of the locking screw 34 are shifted in position from each other, and the direction of shifting in position is such that the center line of the locking screw 34 is shifted toward the side of the forward end of the projection 25C from the center line of the V-groove 25D, whereby, when the tapered surfaces formed at the forward end portions of the locking screws 34 abut against the wall surfaces of the V-grooves 25D, the end faces of the stepped portions 25B of the support stems 25 are pressed against rectilinear portions in the cross-sections of the respective guide rails 31 and 32, so that control can be effected on mounting positions between the guide rails 31, 32 and the support stems 25. Additionally, when the both guide rails 31 and 32 are bonded and solidly secured to the bedplate 21 through the support stems 25, the bonding is effected by use of a positioning jig 400, hereinafter described (Refer to FIG. 18), whereby the respective guide rails 31 and 32 are affixed to the upper surface of the bedplate 21 in parallel thereto with high accuracy, and particularly, the guide rail 31 is adapted to have an accuracy sufficient to serve as a positional reference for the measuring instrument.

A groove 31C is formed on the outer side surface of one of the both guide rails 31 and 32, i.e., the guide rail 31 over the total length, and this groove 31C is in parallel to the center axis of the rail 31 and the bottom surface of the groove 31C is finished with high accuracy by way of simultaneously polishing so as to be in parallel to the outer side surface of the rail 31. The aforesaid scale 33 is adhesively attached into this groove 31C, and, for example, this scale 33 may be formed of a reflection type scale wherein a longitudinal graduation of $\mu$m order is formed on the surface of a stainless steel sheet.

An engageable block 61 as being an engageable member is affixed to the lower portion of one 41 of the supports. Roller groups each consisting of three rollers 62, 63 and 64 are respectively provided at longitudinally (direction of the Y axis) opposite end portions of this block 61. Directions of the normal lines to the peripheral surfaces of these rollers 62, 63 and 64 are varied from one another through 120°, and the bush 62B to be coupled onto a pivot 62A of the roller 62 and the coupled portions of the rollers 63 and 64 on pivots 63A and 64A are shifted by predetermined values from the center line of the pivots, respectively, whereby the directions of the normal lines to the peripheral surfaces of the rollers 62, 63 and 64 are adjustable, so that the rollers 62, 63 and 64 can reliably be in abutting contact with the guide rail 31. Furthermore, out of the rollers 62, 63 and 64, the roller 62 is formed to have a comparatively large width because this roller comes into abutting contact with the rectilinear portion in the cross-section of the rail 31, and other rollers 63 and 64 are formed to have a small width because these rollers comes into abutting contact with circular arcuate portions of the rail 31. Further, the guide rail 31 is in abutting contact with the three rollers 62, 63 and 64 at three points respectively varied in angle through 120°, so that the block 61, i.e., the support 41 cannot move in the directions of the X and Z axes.

Figure 7:
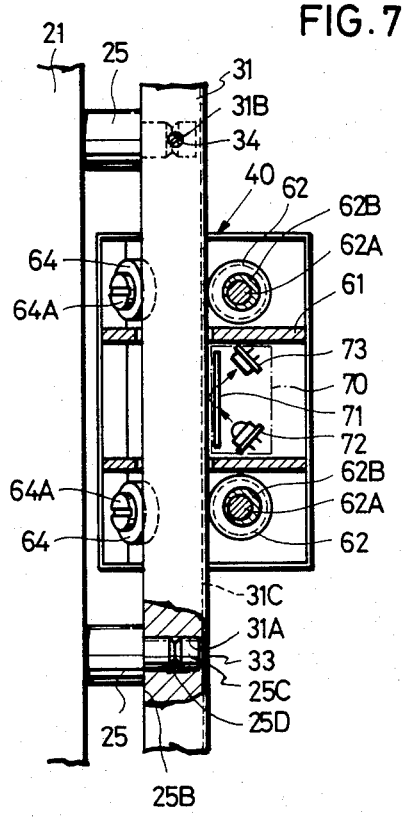
FIG. 7 is a sectional view showing the schematic arrangement in the engageable block used in the present embodiment.
Figure 10:
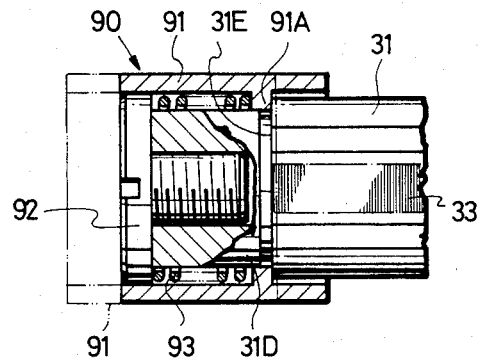
FIG. 10 is an enlarged sectional view showing the shock absorber in the present embodiment.

The engageable block 61 is provided with a measuring unit 70 as being a Y axis direction displacement detector, constituting Y direction measuring means to measure a movement value of the measuring element support member 40 in the direction of the Y axis, in cooperation with the aforesaid scale 33 (Refer to FIGS. 5 and 7). This measuring unit 70 includes: an index scale 71 wherein a graduation similar to that as in the aforesaid scale 33 is formed on a transparent sheet made of glass or the like; a light emitting element 72 as being a light source for sending a light to the surface of the scale 33 through this index scale 71; and a light receiving element 73 as being a receptor for receiving the light emitted from this light emitting element 72 and reflected from the scale 33. The measuring unit 70 can measure a movement value of the support member 40 in the direction of the Y axis through a sine wave-shaped current generated in the light receiving element 73 through a change in the value of the received light by brightness or darkness of both graduations 33 and 71 due to a relative movement between the both scales 33 and 71. In this case, the optical axes of the light emitting element 72 and the light receiving element 73 are arranged in a V-shape, whereby the light emitted from the light emitting element 72 is reflected at the scale 33 and reliably reaches the light receiving element 73.

An engageable block 65 is affixed to the lower portion of the other support 42 (Refer to FIG. 6), roller groups each consisting of two rollers 66 and 67 are respectively provided at longitudinally (direction of the Y axis) opposite end portions of this block 65. These rollers 66 and 67 are disposed on the peripheral surface of the rail 32 through 180° with one another, and the coupled portions of the rollers 66 and 67 on pivots 66A and 67A are shifted by predetermined values from the center line of the pivots, respectively, whereby the positions of the directions of the normal lines to the peripheral surfaces of the rollers 66 and 67 are made adjustable so that the rollers 66 and 67 can reliably be in abutting contact with the guide rail 32. In this case, the guide rail 32 is in abutting contact with the both rollers 66 and 67 at two points respectively varied in angle through 180°, so that the both rollers 66 and 67, i.e., the support 42 can move in the axial direction of the support stem 25 (direction of the X axis).

Figure 8:
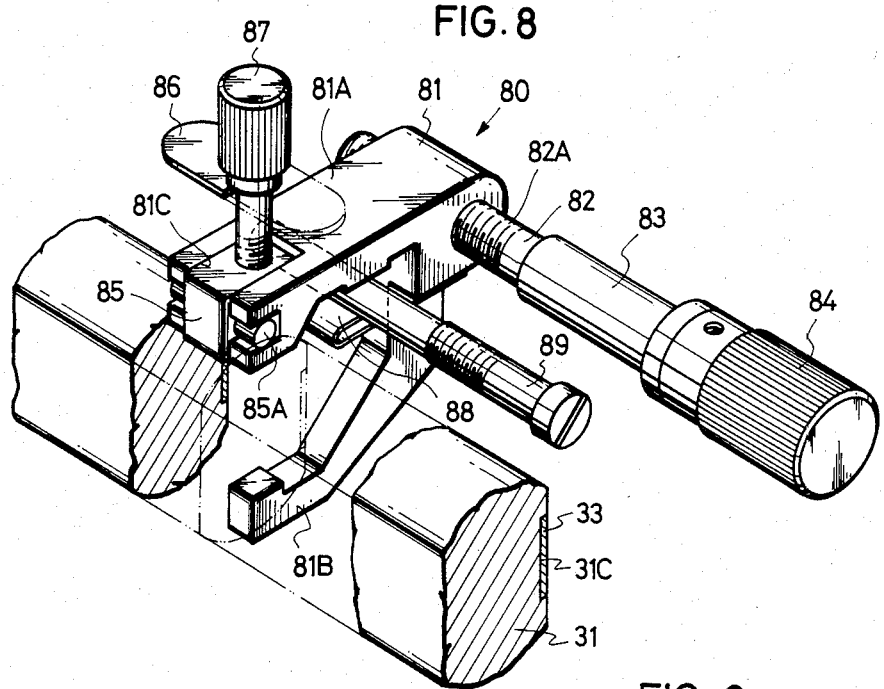
FIG. 8 is an enlarged perspective view showing the fine feed device used in the present emboidment.
Figure 9:
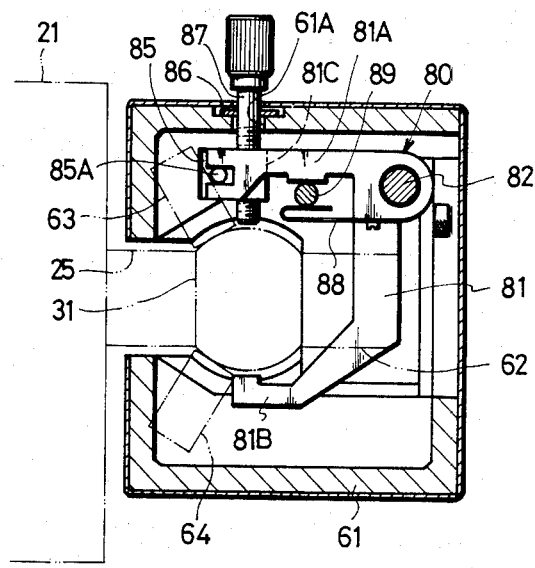
FIG. 9 is an enlarged sectional view thereof.
Figure 12:
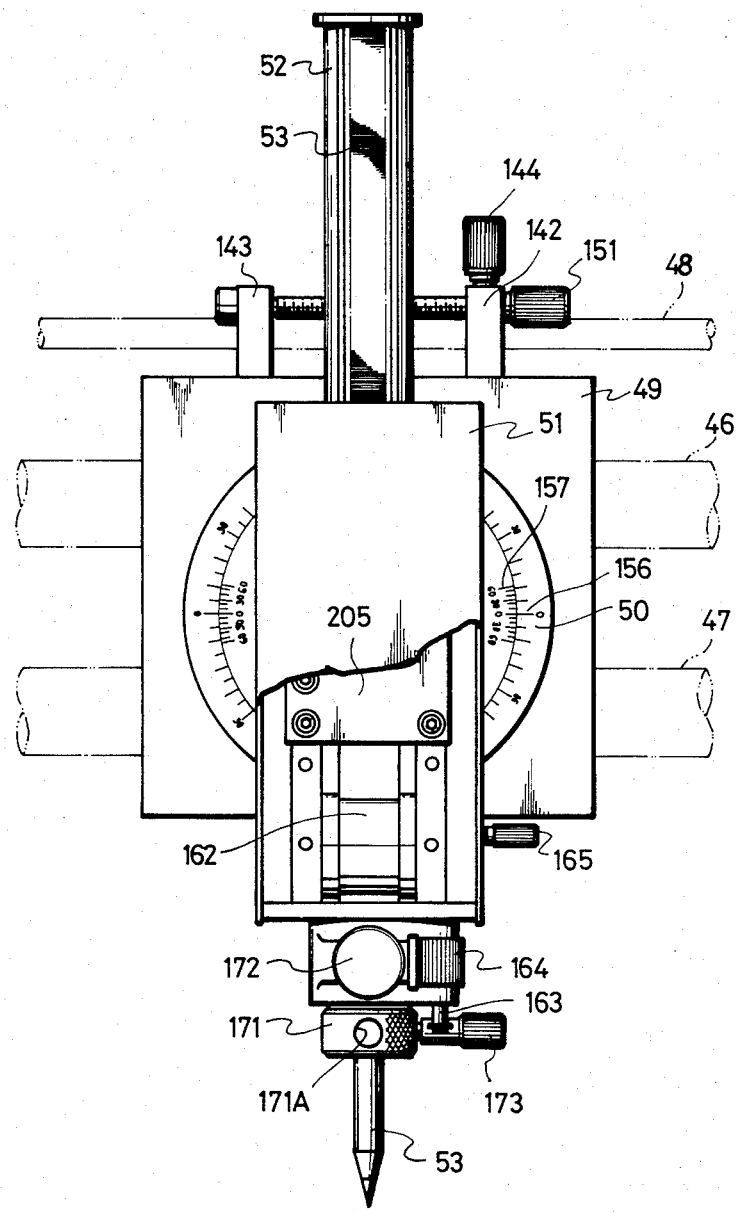
FIG. 12 is a front view thereof.

Furthermore, the engageable block 61 is provided with a fine feed device 80 for the measuring element support member 40. As shown in FIGS. 8 and 9, this fine feed device 80 includes: a frame 81 formed into an inverted C-shape in looking from sideways and provided at the top portion and the bottom portion thereof with crossbars 81A and 81B, respectively, with the forward end portions of the crossbars 81A and 81B being opposed to upper and lower circular arcuate portions of the aforesaid guide rail 31, respectively; a control shaft 82 as being a fine feed means provided at one end thereof with a finely threaded portion 82A threadably coupled into a shoulder of the C-shape of the frame 81, rotatably supported by the engageable block 61 through a bush 83, and having the other end thereof projected from the block 61 and secured with a finger grip 84; an oscillating block 85 oscillatingly supported in a groove 81C formed in the forward end of the upper crossbar 81A of the frame 81 through a pin 85A; a clamp screw 87 as being a clamp member penetratingly, linearlly movably, threadably coupled to this oscillating block 85, capable of being in contact at the lower end thereof with the upper surface of the guide rail 31, and having the upper end thereof projected outwardly through a slot 61A formed in the block 61 and secured with a dust-proof cover 86 blocking this slot 61A; a U-shaped spring 88 as being a resilient means, one end of which is affixed to the undersurface of the C-shape of the frame 81 and the other end of which is turned back inwardly; and a fulcrum shaft 89 for restoring the frame, capable of being in abutting contact at the peripheral surface thereof with the turned-back inner end of this U-shaped spring 88 and the inner surface of the upper portion of the C-shape of the frame 81 and supported by the block 61. This fine feed device 80 is operated such that the clamp screw 87 is screwed in to clamp the guide rail 31 between the clamp screw 87 and the lower crossbar 81B of the frame 81, whereby the engageable block 61 of the measuring element support member 40 is substantially affixed to the guide rail 31 through the frame 81 and the control shaft 82. In this condition, rotation of the control shaft 82 causes the control shaft 82 and the frame 81 to be finely moved relative to each other, so that the measuring element support member 40 can be finely moved on the guide rail 31. On the other hand, when the clamp screw 87 is untightened to release the abutment against the guide rail 31, the block 61 comes to be freely movable relative to the guide rail 31, thus enabling the measuring element support member 40 to be movable as well. In this case, the frame 81 is reliably removed from the peripheral surface of the guide rail 31 through the resiliency of the U-shaped spring 88 abutted at one end thereof against the fulcrum shaft 89.

Figure 4:
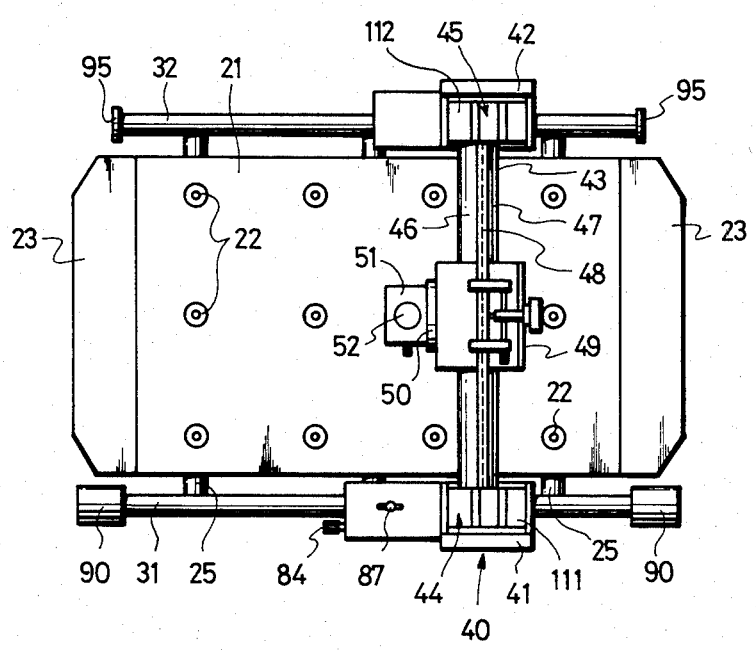
FIG. 4 is a plan view thereof.

Out of the both guide rails 31 and 32, the guide rail 31 is provided at the opposite end thereof with shock absorbers 90, respectively, and the guide rail 32 is secured at the opposite ends thereof with stoppers 95, respectively (Refer to FIGS. 4 and 5). As enlargedly shown in FIG. 10, each of the shock absorbers 90 comprises: a cylindrical member 91 as being a movable member slidably coupled onto a small diameter portion 31D formed at the end portion of the guide rail 31 and having an inner peripheral ridge 91A capable of abutting against a stepped end face 31E formed between the small diameter portion 31D and the large diameter portion of the guide rail 31; a spring receiver 92 threadably coupled to the end portion of the guide rail 31, and having an outer periphery larger than the small diameter portion 31D and smaller than the inner periphery of the cylindrical member 91; and a compression spring 93 interposed between this spring receiver 92 and the inner peripheral ridge 91A of the cylindrical member 91, as being a biasing means or a shock absorbing means for biasing the cylindrical member 91 to constantly abut against the stepped end face 31E. Each of the shock absorbers 90 is operated such that, when the engageable block 61 (to be accurate, a cover fitted onto the block 61) is abutted against the end portion of the cylindrical member 91, which is extended toward the large diameter portion of the guide rail 31, the compression spring 93 is deflected, so that an impact to the engageable block 61 or the measuring element support member 40 can be reduced.

As described above, the stoppers 95 larger in diameter than the guide rail 32 are secured to the opposite ends of the guide rail 32, respectively.

As shown in FIG. 6, the support 41 and the transverse member 43 are connected to each other such that the end face of the transverse member 43 is abutted against the inner wall of the support 41, a bush 101 with a flange secured to the support 41 is inserted into a recess 43A formed at the end portion of this transverse member 43, and a bolt 102 penetrating through this bush 101 with a flange is threadably coupled into the transverse member 43, whereby the support 41 is affixed to the transverse member 43 through the tensile force of the bolt 102. Additionally, the support 42 and the transverse member 43 are connected to each other in the same arrangement as described above, not shown though. In this case, the length of the transverse member 43 across the opposite ends thereof is accurately formed to a predetermined value, and the end faces of the transverse member 43 are formed to be perpendicular to the axis thereof, whereby the distance across the both supports 41 and 42 accurately coincides with the length of the transverse member 43 when the bolt 102 is tightened.

As shown in FIGS. 5 and 6, the connecting portion 44 comprises: a connecting block 111 whose width is smaller than the distance across a front and a rear side walls of the support 41 and inserted between the both side walls with some clearances being held therebetween; bushes 113 and 114 secured to the block 111 in a manner to penetrate therethrough in the direction of the X axis, and receiving therein small diameter portions formed at the end portions of the slider guide rails 46 and 47; bushes 115 and 116 with flanges, partially inserted into the bushes 113 and 114, respectively, with their flanges being engaged with end faces of the bushes 113 and 114, respectively; bolts 117 and 118 penetrating through the bushes 115 and 116, respectively, and threadably coupled into end portions of the guide rails 46 and 47, respectively, to thereby connect the both guide rails 46, 47 to the connecting block 111; positioning bushes 122, 123 and 124 as being screw members, abutted at their ends on one side against the upper and the lower portions of a side wall in the right and the central portion of a side wall in the left of the connecting block 111, respectively, as shown in FIG. 5, and linearly movably, adjustably, threadably coupled at their ends at the other side into reinforcing nuts 119, 120 and 121 affixed to the side walls of the support 41, respectively; bolts 125, 126 and 127 penetrating through the positioning bushes 122, 123 and 124, respectively, and threadably coupled into the connecting block 111, to thereby fix the positioning bushes 122, 123 and 124, respectively; a positioning bush 129 as being a screw member, abutted at one end thereof against the undersurface of the connecting block 111 and linearly movably, adjustably, threadably coupled at the other end thereof into a reinforcing plate 128 of the support 41; and a bolt 130 penetrating through the positioning bush 129, and threadably coupled into the connecting block 111, to thereby fix the positioning bush 129. These positioning bushes 122, 123, 124 and 129 are adjusted in positions, so that the slider guide rails 46 and 47, in turn, the measuring element 53 can be adjusted in position in the directions of the X, Y and Z axes. Here, adjusting means is constituted by the positioning bushes 122, 123, 124 and 129 and the bolts 125, 126, 127 and 130.

As for the other connecting portion 45, only the connecting block 112 is shown in FIG. 3. However, other respects in construction are similar to those of the connecting portion 44, and the positional adjustment in the directions of the X, Y and Z axes can be effected in the same manner as in the connecting portion 44.

In the enlarged perspective view shown in FIG. 9, the slider fine feed rail 48 racked across the top end portions of the connecting blocks 111 and 112 of the both connecting portions 44 and 45 is movable in the axial direction thereof. A portion of the slider fine feed rail 48 inserted into the connecting block 111 is formed with fine threads, not shown. An adjusting nut 141 threadably coupled to the fine threads and supported by the connecting block 111 in a manner to be unmovable in the axial direction, when the adjusting nut is rotated, the fine feed rail 48 can move by a very small value in the axial direction. Furthermore, the intermediate portion of the fine feed rail 48 is slidably inserted through a pair of brackets 142 and 143 erected on the upper surface of the slider, and, when the fine feed rail 48 is clamped by a clamp screw 114 threadably coupled into one 142 of the brackets, the rail 48 and the slider 49 are integrated into a unitary structure. In this condition, rotation of the adjusting nut 141 causes the slider 49 to be finely transferred in the direction of the X axis. A scale 145 is affixed to the upper slider guide rail 46, and, a movement value of the slider 49, in its turn, the measuring element 53 in the direction of the X axis can be detected through the agency of this scale 145 and a detector 181 as being an X axis direction displacement detecting means (Refer to FIG. 13) provided in the slide 49.

A support member angle fine adjustment screw 151 is rotatably, axially unmovably supported between the both brackets 142 and 143 of the slider 49, a nut member 152 is threadably coupled onto this fine adjustment screw 151, a locking screw 153 is inserted into a U-groove 152A (Refer to FIG. 13) formed in the lower portion of this nut member 152, and this locking screw 153 is threadably coupled into the forward end of a crossbar 154A of a rotatable arm 154. In consequence, when this locking screw 153 is untightened, the nut member 152 is movable in accordance with the rotation of the fine adjustment screw 151, whereas, when the locking screw 153 is tightened, the fine adjustment screw 151 is not rotatable. Additionally, the bottom end portion of the rotatable arm 154 is engaged with a rotatable center shaft 182 of the spindle support member 51 through a sliding block 183. A clamp screw 155 inserted into this rotatable arm 154 is screwed in, whereby the sliding block 183 is brought into pressing contact with the center shaft 182, so that the rotatable arm 154 can be integrally affixed to the rotatable center shaft 182.

For this, in the condition where the clamp screw 155 is untightened, the spindle support member 51 is tiltable relative to the slider 49. On the other hand, when the clamp screw 155 is tightened, the spindle support member 51 can be fixed at a desirable angle. Further, when this clamp screw 155 is in the tightened condition, the locking screw 153 is untightened and the fine adjustment screw 151 is rotated, the inclination of the support member 51 can be finely adjusted. Furthermore, the inclination of the support member 51 at this time can be accurately read through a main scale 156 and an auxiliary scale 157 of the angle measuring means 50. In this case, for example, the main scale 156 is provided on the slider 49, and, the auxiliary scale 157 on the spindle support member 51. However, this order may be reversed. Furthermore, a compression spring 184 is confined between the sliding block 183 and a recess in the rotatable arm 154, a frictional force of a predetermined value is rendered between the sliding block 183 and the center shaft 182 through the biasing force of this spring 184, and, even if the clamp screw 155 is untightened, the spindle support member 51 is not rotated immediately due to this frictional force.

Figure 14:
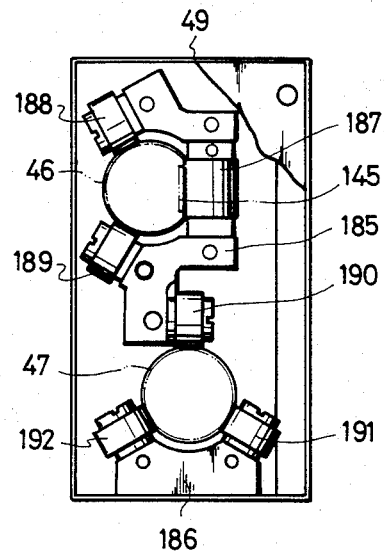
FIG. 14 is an enlarged side view showing a portion of the inner construction of the slider.

In the slider 49, roller support frames 185 and 186 are fixed as shown in FIG. 14. Four rollers 187, 188, 189 and 190 are rotatably supported on the support frame 185, while, two rollers 191 and 192 are rotatably supported on the support frame 186. Out of these rollers, the three upper rollers 187, 188 and 189 are brought into contact with the peripheral surface of the slider guide rail 46 at three points respectively varied in angle through 120°, while, the three lower rollers 190, 191 and 192 are brought into contact with the peripheral surface of the lower slider guide rail 47 at three points respectively varied in angle through 120°, whereby the movement of the slider 49 is smoothed. In this case, the roller 187 is brought into contact with the rectilinear portion of the upper rail 46, i.e., the surface where the scale 145 is provided, so that the scale 145 and an index scale, not shown, where the detector 181 is provided, can move in parallel to each other. Additionally, the rollers 187 through 192 are coupled onto eccentric shafts or eccentric bushes, contacts of these rollers with the rails 46 and 47 are adjustable, the scale 145 is positioned mainly by the three upper rollers 187 through 189, and the weight of the slider 49 is held mainly by the three lower rollers 190 through 192.

Figure 13:
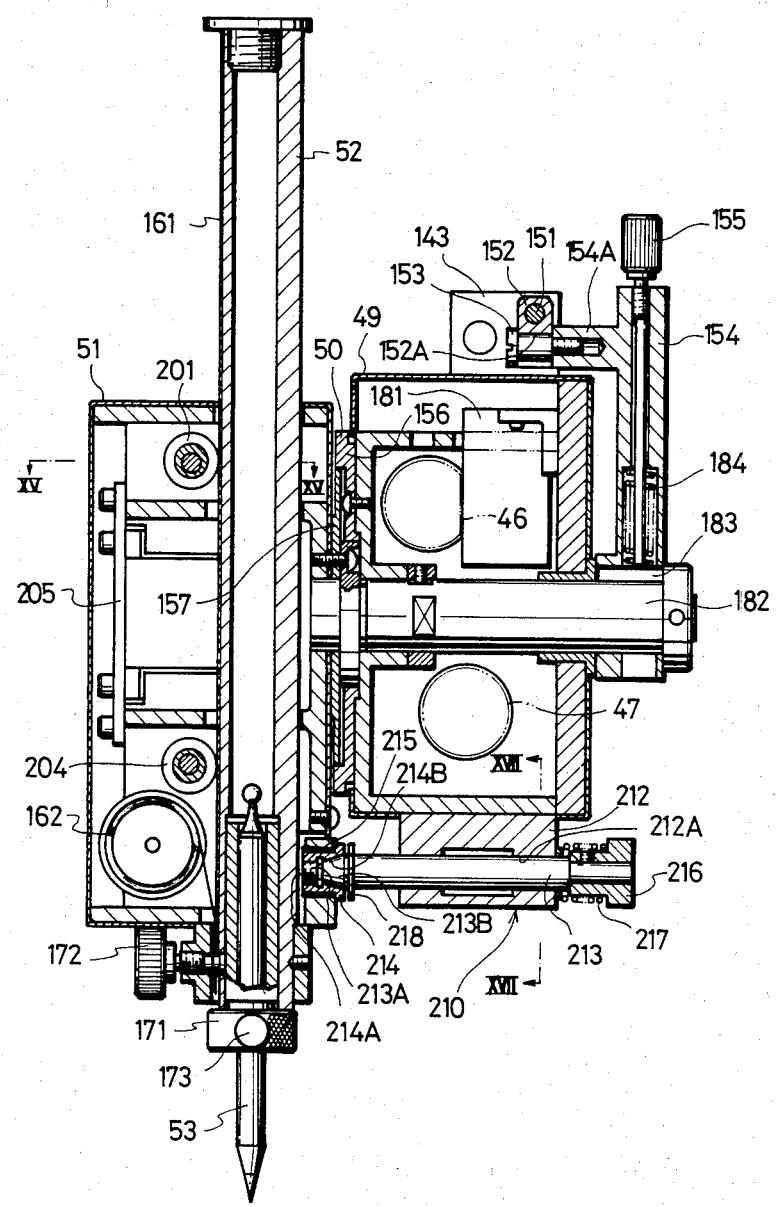
FIG. 13 is a sectional view thereof.
Figure 15:
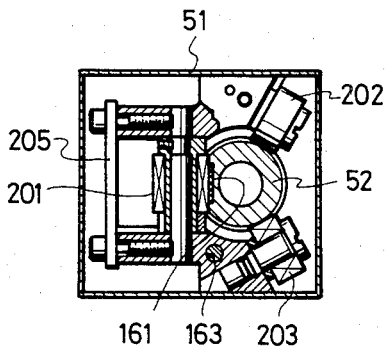
FIG. 15 is a sectional view taken along the line XV—XV in FIG. 13.

The spindle 52 is provided with a scale 161 in the axial direction thereof. This spindle 52 is slidably supported by three upper and lower rollers provided in the spindle support member 51 in the axial direction thereof. Out of these rollers, three upper rollers 201, 202 and 203 have normal lines thereof varied in angle through 120° from one another as shown in FIG. 15. Out of the three lower rollers, only the roller 204 is shown in FIG. 13, and yet, disposed at the regular angular interval of 120° as with the upper rollers 201 through 203. Furthermore, these rollers 201 through 204 are coupled onto eccentric shafts or eccentric bushes, so that abutment thereof against the spindle 52 can be adjusted.

Through the agency of the scale 161 and a detector 205, as being a Z axis direction displacement detector, provided in the spindle support member 51, a movement value of the spindle 52, in its turn, the measuring element 53 in the axial direction can be measured, that is, when the inclination of the support member 51 is zero, a movement value in the direction of the Z axis can be measured. Furthermore, a constant load spring 162 formed of a thin wall, large width spring material and one end of which is wound into a spiral spring shape is stretched between the bottom end of the spindle 52 and the support member 51, this constant load spring 162 biases the spindle 52 to rise at a small speed under a balance with its gravity, and, when the spindle 52 is lowered, the surface of the scale 161 can be protected.

A spindle fine feed shaft 163 disposed in parallel to the spindle 52 is axially movably supported at the lower end portion of the spindle 52, an adjusting nut 164 threadably coupled to fine threads, not shown, formed on this fine feed shaft 163 is rotatably, axially unmovably supported by the lower portion of the spindle 52. Rotation of this adjusting nut 164 causes the spindle 52 and the fine feed shaft 163 to move relative to each other in the axial direction. Furthermore, a clamp screw 165 to affix the fine feed shaft 163 to the support member 51 is threadably coupled into the side surface of the support member 51. The adjusting nut 164 is rotated in a condition where the fine feed shaft 163 is affixed by this clamp screw 165, so that the spindle 52 can be finely transferred in the axial direction thereof.

Further, a measuring element mounting portion 52A being cylindrical and hollow is formed at the lower end of the spindle 52, a cylindrical portion 171A of an adapter, i.e., a measuring element mounting bush 171 is detachably inserted into the measuring element mounting portion 52A, and this cylindrical portion 171A is affixed to the spindle 52 by means of a set-screw 172 as being a first fixing means penetrating through and being threadably coupled into the measuring element mounting portion 52A of the spindle 52.

Figure 16:
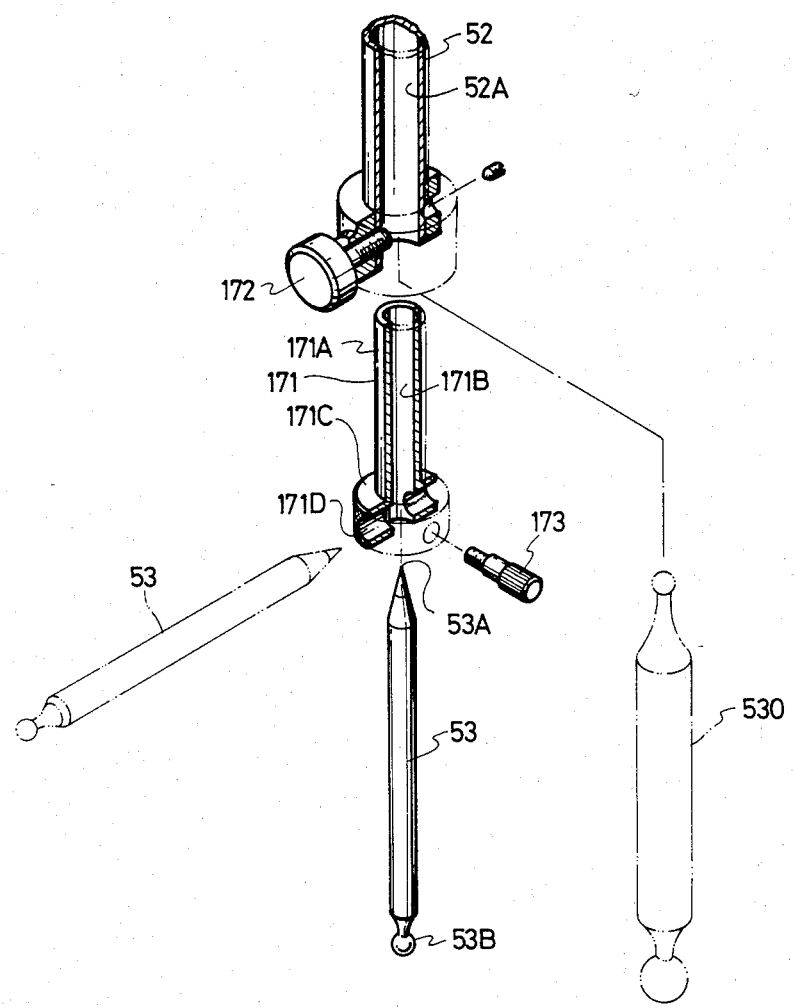
FIG. 16 is a disassembled perspective view in which part of the lower portion of the spindle is sectioned.

Penetrated through the core portion of the measuring element mounting bush 171 is a first through-hole 171B being a circular shape in cross section and coaxial of the cylindrical hollow portion of the measuring element mounting portion 52A of the spindle 52. Furthermore, penetrated through a flange portion 171C formed at the side opposite to the cylindrical portion 171A of the bush 171 is a second through-hole 171D being a circular shape in cross section, perpendicularly intersecting the first through-hole 171B and having an inner diameter equal to that of the through-hole 171B as shown in FIG. 16.

A measuring element 53 having an outer diameter equal to the inner diameter of the first through-hole 171B is detachably inserted into the first through-hole 171B of the measuring element mounting bush 171 and affixed to the bush 171 by means of a set-screw 173 as being a second fixing means penetrating through the flange portion 171C of the bush 171 and threadably coupled into the first through-hole 171B. This measuring element 53 is formed at opposite ends thereof with contact portions 53A and 53B differing in shape from each other, one contact portion 53A is formed into a sharp-pointed shape and the other contact portion 53B is formed into a spherical shape.

Figure 17:
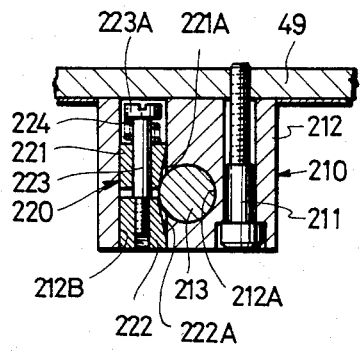
FIG. 17 is a sectional view taken along the line XVII—XVII in FIG. 13.

As shown in FIGS. 13 and 17, provided at the undersurface of the slider 49 is a positioning device 210 for positioning the spindle support member 51 at a predetermined angle to the slider 49, such for example as the axis of the spindle 52 is aligned with the vertical line (direction of Z axis). This positioning device 210 comprises: a bearing member 212 affixed to the slider 49 through a bolt 211; an engageable shaft 213 as being a first member supported on this bearing member 212 in a manner to be slidable in the horizontal direction and integrally formed at one end portion thereof with external threads 213A as being a screw portion and a taper shaft 213B as being a tapered portion, both of which are coaxial with each other; an engageable bush 214 as being a second member coaxially, integrally formed with internal threads 214A as being a screw portion and a tapered hole 214B as being a tapered portion, which are to be threadably coupled to and engaged with the external threads 213A and the taper shaft 213B of this engageable shaft 213, respectively, positioned and fixed through a bonding agent 215 to the spindle support member 51; a finger grip 216 affixed to the other end of the engageable shaft 213; a compression coil spring 217 as being a releasing means confined between this finger grip 216 and the bearing member 212, biasing the engageable shaft 213 in a direction of being separated from the engageable bush 214, and keeping the engageable shaft 213 out of way of the spindle support member 51 during rotation thereof; a stopper 218 secured to the engageable shaft 213 in the vicinity of the taper shaft 213B, and preventing the engageable shaft 213 from falling off the bearing member 212 due to the biasing force of the spring 217 to the right in the drawing; and a position regulating means 220 provided in the bearing member 212, and engaged with the intermediate portion of the engageable shaft 213, for preventing the engageable shaft 213 from jolting in the bearing member 212 so that the engageable shaft 213 can be regurated to always slide in a predetermined course.

As shown in FIG. 17, the position regulating means 220 comprises: an engageable member insertion hole 212B partially crossing a shaft hole 212A, through which the engageable shaft 213 is inserted, in the aforesaid bearing member 212; a pair of engageable members 221 and 222 slidably received in this insertion hole 212B and respectively formed with obliquely cut-away surfaces 221A and 222A being brought into abutting contact with the outer peripheral surface of the engageable shaft 213 partially exposed to the interior of the insertion hole 212B; a connectiong bolt 223 slidably penetrating through one 221 of engageable members and threadably coupled at the forward end thereof into the other 222 of the engageable members; and a compression spring 224 as a biasing means confined between a head 223A of this connecting bolt 223 and one 221 of the engageable members, and biasing both the engageable members 221 and 222 in directions of approaching each other to press the obliquely cut-away surfaces 221A and 222A of the both engageable members 221 and 222 against one side of the peripheral surface of the engageable shaft 213, respectively, whereby the other side of the peripheral surface of the engageable shaft 213 is constantly pressed against one side of the wall surface of the shaft hole 212A, so that looseness between the engageable shaft 213 and the shaft hole 212A can be eliminated.

Figure 18:
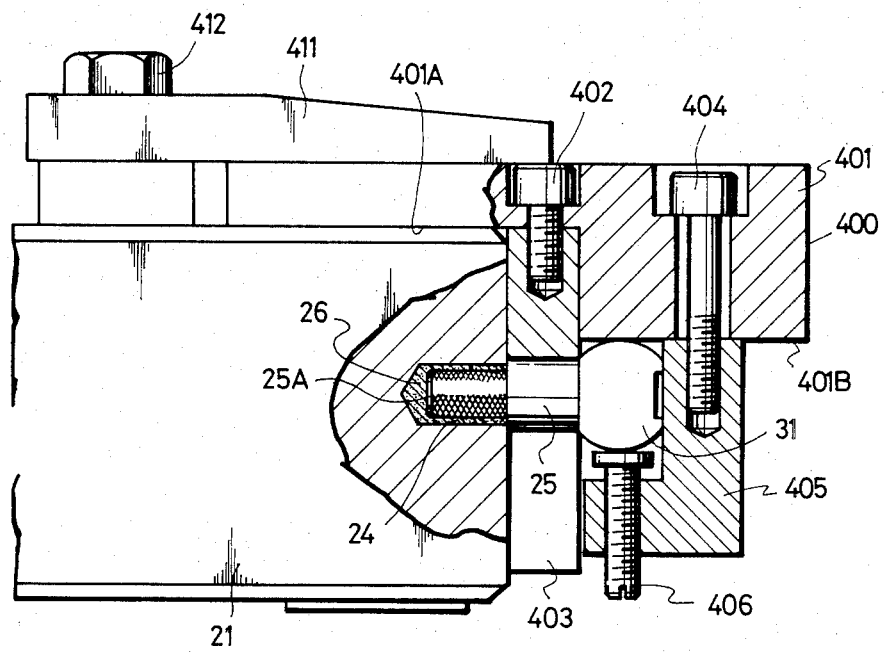
FIG. 18 is a partially sectional front view showing an example of the jig used in the present embodiment.

Description will hereunder be given of method of assembling the guide rails and the rollers with reference to FIG. 18.

Projections 25C as being rail supporting portions of the support shafts 25 are inserted into a plurality of hole-like recesses 31A and 32A formed in the guide rails 31 and 32, and locking screws 34 are threadably coupled into threaded holes 31B and 32B of the guide rails 31 and 32 and the forward ends of the screws 34 are engaged with V-grooves 25D of the support shafts 25, whereby end faces of stepped portions 25B of the support shafts 25 are moved to abut against the rectilinear portions in cross section of the guide rails 31 and 32 owing to shifts between the center axes of the locking screws 34 and the centers of the V-grooves 25D, so that the positioning between the guide rails 31, 32 and the support shafts 25 can be performed due to the aforesaid abutments. In this case, a scale 33 is accurately positioned in advance and bonded to a groove 31C of one 31 of the guide rails.

Subsequently, small diameter proximal end portions 25A of the support shafts 25 are inserted into holes 24 of the bedplate 21 in conditions where bonding agents 26 are interposed therebetween, and positioning is performed by use of a jig 400 shown in FIG. 18 such that the axes of the guide rails 31 and 32 come to be in parallel to the upper surface of the bedplate 21, and the bonding agents 26 are allowed to be solidified. More specifically, the jig 400 comprises: a base 401 formed with a first and a second surfaces 401A and 401B precisely brought into parallel to each other and having a step of a predetermined distance; a spacer 403 affixed to a stepped portion of this base 401 through a bolt 402, having a comb-shape so as to be relieved from portions of the support shafts 25, and determining the dimension between the side surface of the bedplate 21 and the inner rectilinear portion in cross section of the guide rail 31; an L-bracket 405 secured to the second surface 401B of the base 401 through a bolt 404 in a manner to be adjustable in the lateral direction, being abutted against the outer rectilinear portion in cross section of the guide rail 31 to press the guide rail 31 against the spacer 403; and a plurality of pressing screws 406 linearly movably, threadably coupled into the L-bracket 405 and pressing by their own inner ends the guide rail 406 against the second surface 401B to determine the dimension. This jig 400 is mounted to the bedplate 21 through a retainer brace 411 and a bolt 412, and the upper surface of the guide rail 31, i.e., the axis is brought into parallel to the upper surface of the bedplate 21 through the agency of the first and the second surfaces 401A and 401B of the base 401. The other guide rail 32 is fixed by a jig similar to the above, however, in this case, the parallelism between the guide rail 31 and the other guide rail 32 does not count.

After the bonding agents 26 have been solidified, the measuring element support member 40 is assembled to the both guide rails 31 and 32. Since this assembling is referenced from the guide rail 31, firstly, adjustments are made by use of eccentric bush 62B and eccentric shafts 63A, 64A of the rollers 62, 63 and 64 on the side of the support 41 can properly abut against this guide rail 31. With this arrangement, the measuring support member 40 is assembled as referenced from the guide rail 31. Subsequently, adjustments are made similarly so that the rollers 66 and 67 of the support 42 can properly abut against the guide rail 32, thus enabling to complete the assembling as a whole. In this case, the rollers 66 and 67 of the support 42 are abutted against the guide rail 32 from above and below, and hence, movable in the axial direction of the rail support shaft 25. In consequence, both the supports 41 and 42, which have been determined by transverse member 43 in dimension, are supported by the both guide rails 31 and 32 in a manner to hold the interval thus determined in dimension.

Subsequently, adjustment is made such that a measuring unit 70 as being a detecting portion secured to an engageable block 61 as being an engageable member is brought into parallel to the scale 33, and has a clearance of a predetermined value therebetween. This adjustment is effected in such a way that the measuring unit 70 as a whole is adjusted by use of an ordinary adjusting means, not shown, one or a plurality of eccentric shafts or adjusting screws or the like, for example. In this case, adjustment of the unit 70 may be effected as referenced from the rectilinear portion in cross section (a planar portion) of the guide rail 31. In the case of doing so, the adjustment may be facilitated by inserting a gauge of a predetermined size between the planar portion of the guide rail 31 and the index scale 71 of the measuring unit 70 and so forth.

Description will hereunder be given of the method of manufacturing the positioning device 210 in the present embodiment.

The engageable shaft 213 secured thereto with the stopper 218 is inserted and extended through the bearing member 212 from the side opposite to the stopper 218. Subsequently, the engageable members 221 and 222 are inserted into the insertion hole 212B of the bearing member 212 from opposite sides thereof, the obliquely cut-away surfaces 221A and 222A of the engageable members 221 and 222 are abutted against the engageable shaft 213, the connecting bolt 223 is threadably coupled into the engageable members 221 and 222 in a condition where the compression spring 224 is confined, the both engageable members 221 and 222 press the engageable shaft 213 against the side wall of the shaft hole 212A, partial assembling of the portions of the bearing member 212, and this partially assembled product is affixed to the undersurface of the slider 49 by means of the bolt 211.

On the other hand, the spindle support member 51 is precisely positioned and affixed to the slider 49 by use of the angle measuring means 50 and the angle fine adjustment screw 151 and the like, and the engageable bush 214 is mounted in an excessively large hole, i.e., a so-called clearance hole formed in the frame of the spindle support member 51 through the bonding agent 215. Until this bonding agent 215 is solidified, the engageable shaft 213 is connected to this engageable bush 214. This engageable shaft 213 is connected to the engageable bush 214 through the external and internal threads 213A, 214A, and the taper shaft 213B and the tapered hole 214B of the both members, whereby the both members are accurately positioned. In this case, the procedure of insertion of the engageable bush 214 into the clearance hole and connection with the engageable shaft 213 may be reversed, regardless of whichever one may be performed first.

The bonding agent 215 is allowed to solidify in the condition where the engageable shaft 213 as being the first member and the engageable bush 214 as being the second member are thus connected to each other. Upon completion of the solidification, the engageable shaft 213 and the engageable bush 214 are released from each other, and subsequently, a finger grip 216 is secured to the right end of the engageable shaft 213 in a condition where the compression coil spring 217 is confined, thus enabling to complete the manufacture and assembling of the positioning device 210. Thereafter, if the slider 49 and the spindle support member 51 are made free from each other and connection of the engageable shaft 213 and the engageable bush 214 is effected by means of the threads 213A and 214A, the taper shaft 213B and the tapered hole 214B, then the slider 49 and the spindle support member 51 can be accurately positioned at predetermined positions at all times.

Description will hereunder be given of the method of assembling and adjusting in the present embodiment.

In assembling, the various parts are assembled to provide intermediately assembled products, i.e., a unit including the bedplate 21 and the guide rails 31 and 32, a unit including supports 41 and 42, a unit including the slider 49, and a unit including the spindle support member 51 and the spindle 52, respectively. Except the foregoing description, in this assembling, it suffices to assemble the parts one after another in the same manner as in an ordinary assembling.

The units thus assembled are further assembled to one another. Before being assembled to the unit of the bedplate 21, the measuring element support member 40 is assembled. More specifically, the unit of the spindle support member 51 is assembled to the unit of the slider 49, and these are provisionally affixed to the connecting blocks 111 and 112 of the both connecting portions 44 and 45 through the two slider guide rails 46, 47 and the fine feed rail 48. On the other hand, the opposing supports 41 and 42 are assembled by use of a transverse member 43 and another transverse member for determining the dimension as necessary, an interval across the opposing supports 41 and 42 is accurately set to the dimension of the transverse member 43 and affixed, and the connecting portions 44 and 45 provided with the slider 49 are provisionally fixed between the supports 41 and 42, the distance across which has been determined by use of positioning bushes 122, 123, 124 and 129, and bolts 125, 126, 127 and 130.

Subsequently, the measuring element support member 40 thus provisionally fixed is assembled to the both guide rails 31 and 32 affixed to the bedplate 21. Since this assembling is referenced from the guide rail 31, adjustments are made by use of the eccentric bushes 62B and the eccentric shafts 63A and 64A of the rollers 62, 63 and 64, so that the rollers 62, 63 and 64 on the side of the support 41 can properly abut against the guide rail 31. With this arrangement, the measuring element support member 40 is assembled as referenced from the guide rail 31. Subsequently, adjustments are made so that the rollers 66 and 67 of the support 42 can properly abut against the guide rail 32 in the same manner as described above, thus enabling to complete the provisional assembling as a whole. In this case, the rollers 66 and 67 of the support 42 abut against the guide rail 32 from above and below, and hence, are movable in the axial direction of the rail support shaft 25, so that the both supports 41 and 42, the distance across which has been determined by use of the transverse member 43, can be supported by the both guide rails 31 and 32 in a condition where the both supports 41 and 42 hold the distance thus determined.

Upon completion of the provisional assembling as described above, the transverse member assembled between the both supports 41 and 42 as necessary is removed, whereby adjustments are started.

To start the adjustments, except the clamp screw 155 to allow the inclination of the spindle support member 51, other clamp screws 87, 144 and 165 are untightened, the support 41, the slider 49 and the spindle 52 are made free from one another in their movement, and the measuring element 53 is made movable to desirable positions in the directions of the X, Y and Z axes. Under this condition, in order to smooth the movement of the slider 49 along the both slider guide rails 46 and 47, the positions of the slider guide rails 46 and 47 relative to the both connecting blocks 111 and 112 are adjusted, and, upon completion of adjustment, the slider guide rails 46 and 47 are fixed by means of the bolts 117 and 118.

Subsequently, the measuring instrument itself is adjusted in accuracy. At this time, setting is made by use of the angle measuring means 50 such that the spindle support member 51 is set at a predetermined angle relative to the slider 49, i.e., the spindle 52 perpendicularly intersects the slider guide rails 46 and 47. Under this condition, a workpiece having the standard dimensions is mounted on the bedplate 21, and adjustments are made so that the measuring element 53 can accurately move in the directions of the X, Y and Z axes, respectively, while the measuring element 53 is in contact with the workpiece having the standard dimensions. These adjustments are made on the both connecting portions 44 and 45, while the locking bolts 125, 126, 127 and 130 are untightened to a suitable extent and the positioning bushes 122, 123, 124 and 129 are linearly moved.

In addition, in making adjustments, an indicating device such as a test indicator is mounted on the spindle 52 in place of the spindle 52, and, if adjustments is made so that a needle of the test indicator can avoid deflecting, then adjustments can be facilitated. Furthermore, the accuracy of the measuring instrument purely through the mechanical construction can be set without resorting to any electric system in the measuring instrument.

Description will hereunder be given of the method of using the present embodiment with reference to FIGS. 19 through 24.

In starting the use, except the clamp screw 155 to allow the inclination of the spindle support member 51, other clamp screws 87, 144 and 165 are untightened, the support 41, the slider 49 and the spindle 52 are made free from one another in their movement, and the measuring element 53 is made movable to desirable positions in the directions of the X, Y and Z axes. Under this condition, the measuring element support member 40 is moved to one end of the bedplate 21 as shown in FIG. 3.

Subsequently, the workpiece 54 is moved onto the bedplate 21. Since there is no obstacle at the opposite sides of the bedplate 21, the workpiece 54 may be moved onto the bedplate 21 from one side of the bedplate 21 as indicated by an arrow shown in FIG. 19, or may be mounted on the bedplate 21, extending over the width of the bedplate 21 as shown in FIG. 20. Thus, the workpiece 54, which has been moved onto the bedplate 21, is affixed to the bedplate 21 by use of the suitable threaded holes 22 on the bedplate 21, for securing the workpiece and a mounting jig, not shown.

Dimensions, shape and so forth of the various parts of the workpiece 54, which has been affixed onto the bedplate 21, are measured in the same manner as with the conventional coordinate measuring instrument. More specifically, the lower portion of the spindle 52 is grasped by an operator, the forward end of the measuring element is brought into contact with predetermined positions of the workpiece from one position to another, displacement values of the measuring element 53 in the directions of the X, Y and Z axes at this time are read by means of the measuring unit 70 as being the Y axis direction displacement detector secured to the engageable block 61 of the support 41, the X axis direction displacement detector 181 and the Z axis direction displacement detector 205, which are provided in the slider 49 and the spindle support member 51, respectively, and the scales 33, 145 and 161, thereupon, indicated on the indicator or the like, not shown, further, data-processed in the data processing unit commonly used, and printed out.

The clamp screws 87, 144 and 165, which have been untightened as necessary, are tightened and there may be affected fine feeds of the supports 41 and 42 in the direction of the Y axis, of the slider 49 in the direction of the X axis and/or of the spindle 52 in the direction of the Z axis. Further, as shown in FIG. 11, in measuring a vertical plane or the like, the measuring element 53 may be secured into a horizontal mounting hole 171A of the mounting bush 171 to thereby make the measurement.

Detailed description will now be given of the fine feed of the supports 41 and 42 in the direction of the Y axis with reference to FIGS. 8 and 9.

As shown in FIG. 9, under a condition where the forward end of the clamp screw 87 and the lower crossbar 81B of the frame 81 are separated from the guide rail 31, and the guide rail 31 and the engageable block 61 are free from each other, if the clamp screw 87 is screwed in, then, firstly, the forward end of the clamp screw 87 abuts against the center of the circular arcuate portion in cross section of the guide rail 31. If the clamp screw 87 is further screwed in, then the frame 81 is rotated about the control shaft 82 against the U-shaped spring 88 in the clockwise direction in FIG. 9, and the forward end of the lower crossbar 81B abuts against the center of the lower circular arcuate portion in cross section of the guide rail 31, whereby the guide rail 31 is clamped between the clamp screw 87 and the crossbar 81B and fixed thereat.

Subsequently, if the control shaft 82 is rotated, then the control shaft 82 and the engageable block 61 connected to this control shaft 82 through a bush 83 are finely fed in the longitudinal direction of the guide rail 31, i.e., a so-called fine feed is performed, because this control shaft 82 is rotatably and axially unmovably on the bush 83 between the end portion of a fine screw 82A being large in diameter and the end portion of the finger grip 84 (Refer to FIG. 5) and the frame 81 threadably coupled to the fine screw 82A of this control shaft 82 is affixed to the guide rail 31 as aforesaid.

After the fine feed has been completed as described above, if the clamp screw 87 is untightened, then the frame 81 is rotated through the agency of the U-shaped spring 88 in the counterclockwise direction in FIG. 9 and the crossbar 81B is separated from the undersurface of the guide rail 31. If the clamp screw 87 is further untightened, then the U-shaped spring 88 is turned into a free shape to thereby loose the resiliency, and the clamp screw 87 is separated from the upper surface of the guide rail 31, whereby clamping of the guide rail 31 by the fine feed device 80 is entirely released. With this arrangement, the engageable block 61 is freely movably relative to the guide rail 31.

When the measuring element support member 40 is moved in the longitudinal direction to a considerable extent during the moving operation thereof and brought into abutting contact with the shock absorber 90, the compression spring 93 within the shock absorber 90 is deflected, whereby a shock given to the measuring element support member 40 is relieved, so that occurrence of deformation or the like in the measuring element support member 40 can be effectively prevented.

Measuring of a portion having an inclination of a predetermined angle to the direction of the Z axis is performed in such a manner the spindle support member 51 is inclined to meet the angle. This inclination of the spindle support member 51 is obtained such that engagement between the engageable shaft 213 of the positioning device 210 and the bush 214 is released to allow the support member 51 to be desirably inclined by loosening the clamp screw 155. Under this condition, while the angle measuring means 50 is being inspected so that a desirable angle may be obtained, the support member 51 is inclinedly set and fixed thereat through tightening of the clamp screw 155. Subsequently, in a condition where the locking bolt 153 is untightened, the angle adjusting screw 151 is turned to make a fine adjustment in angle.

FIGS. 21 through 24 show examples of the case of measuring the portions having a predetermined angle as described above.

Figure 21:
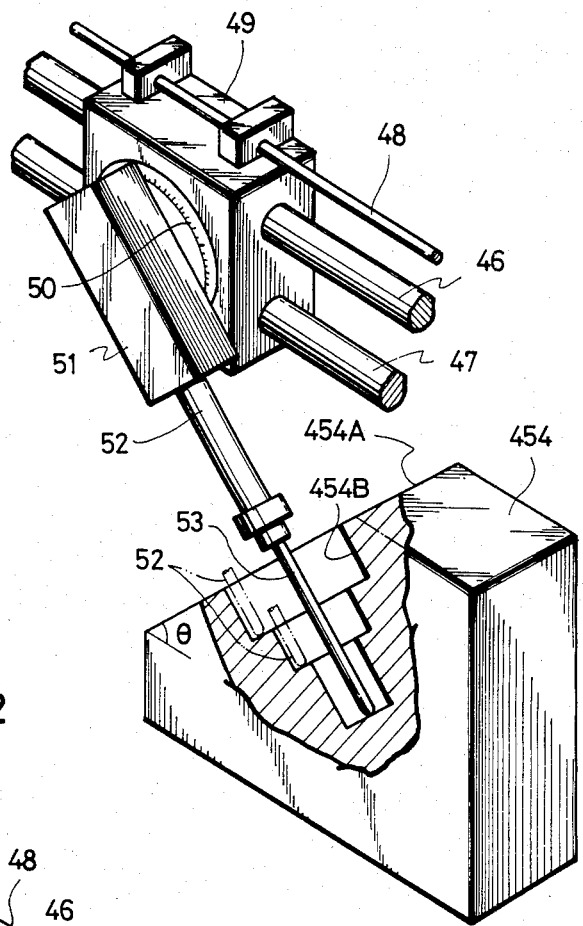

More specifically, FIG. 21 is an example in which a workpiece 454 to be measured has an inclined surface 454A being inclined at an angle $\theta$ to the horizontal plane and a stepped hole 454B is formed in a direction perpendicular to this inclined surface 454A. In order to measure depths of stepped portions in this hole 454B, the spindle support member 51 is inclined and fixed such that the axis of the spindle 52 perpendicularly intersects the inclined surface 454A. Under this condition, the movement of the spindle support member 51 in the direction of the X axis is fixed, and the spindle support member 51 is moved in the directions of the Y and Z axes to cause the measuring element 53 to abut against the stepped portions of the hole 454B one after another, so that the depths of the stepped portions of this hole 454B can be read as a movement value in the axial direction of the spindle 52, i.e., a one-dimentional value.

Figure 22:
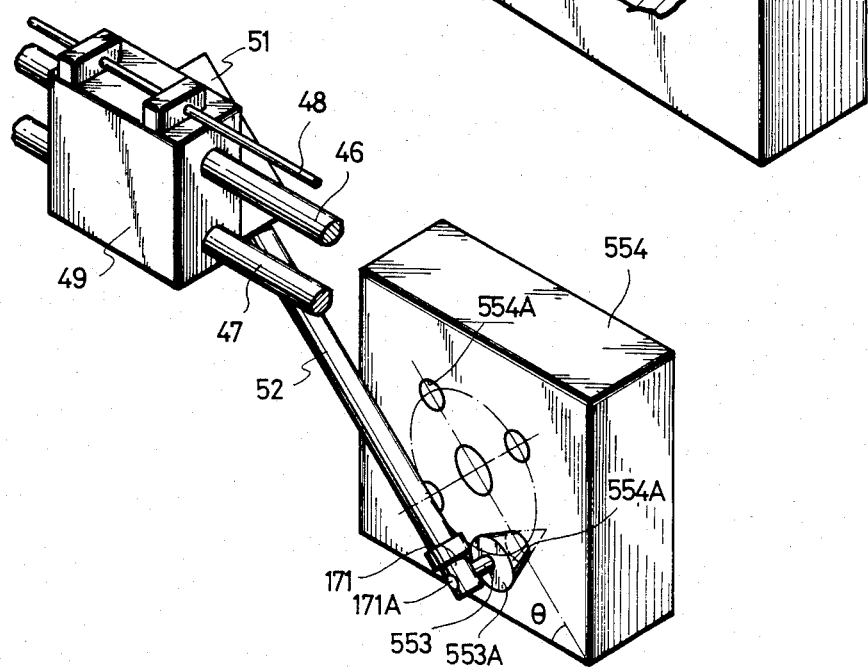

A workpiece 554 to be measured as shown in FIG. 22 has holes 554A being inclined at an angle $\theta$ to the horizontal plane. In order to measure a pitch between these holes 554A, the measurement can be performed in the same manner as shown in FIG. 8. In this case, a measuring element 553 provided at the forward end thereof with a conical portion 553A is used, and, if this measuring element 553 is mounted into a mounting hole 171A formed through the measuring element mounting bush 171 in the lateral direction thereof, then the measurement can be quickly performed.

Figure 23:
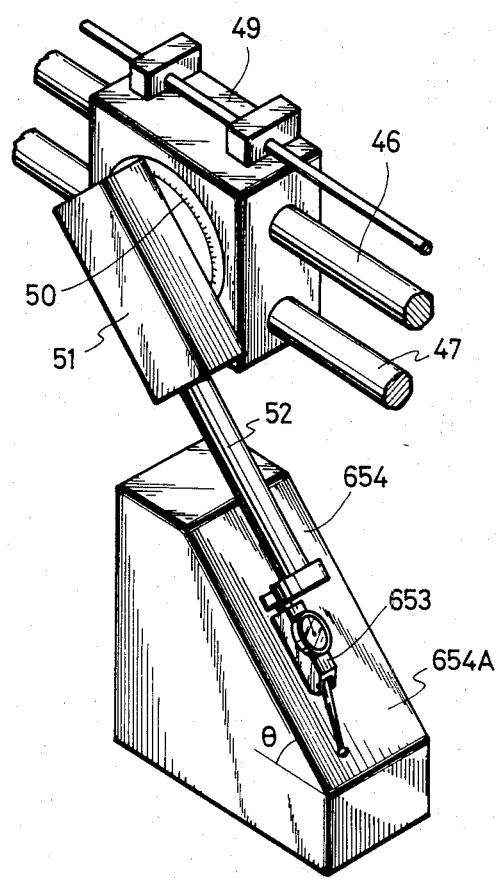

A workpiece 654 to be measured as shown in FIG. 23 has an inclined surface 654A being inclined at an angle $\theta$ to the horizontal plane. To measure the angle of this inclined surface 654A, a test indicator 653 is secured to the forward end of the spindle 52, the spindle support member 51 is inclined to an extent where, even if the spindle 52 is moved in the axial direction thereof, a needle of this test indicator 653 is not deflected, and, when the graduation of the angle measuring means 50 is read at this time, the angle $\theta$ of the inclined surface 654A is obtained.

Figure 24:
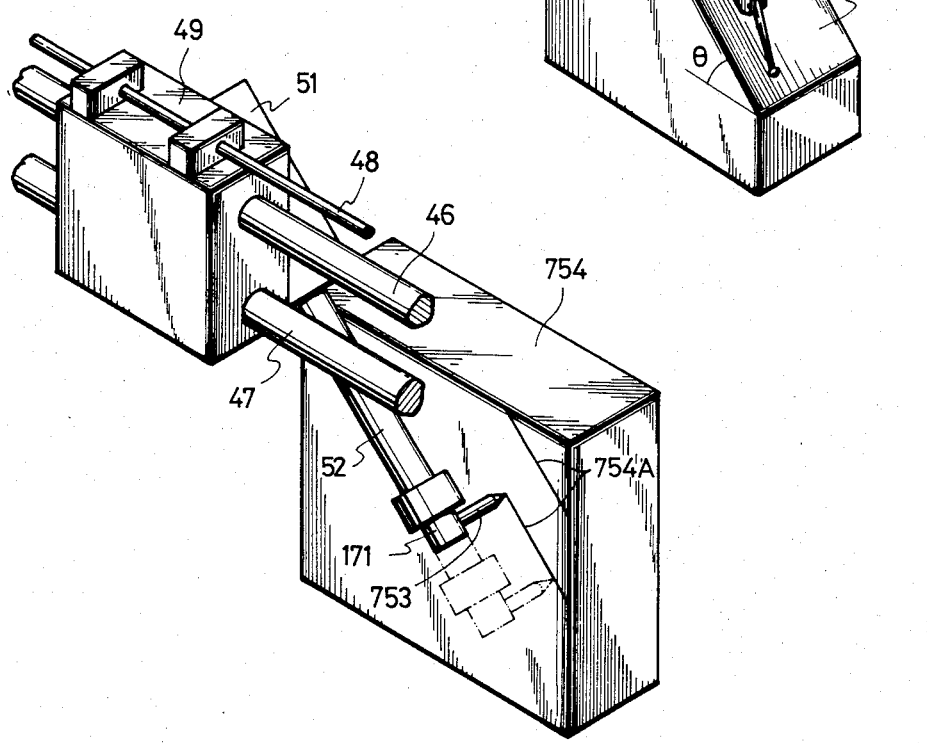

FIG. 24 shows the case where marking-off lines 754A are provided at a predetermined angle on one side surface of a workpiece 754 to be measured (To be accurate, an article on which marking-off is made). A marking-off pin 753 is secured to the forward end of the spindle 52 through a mounting bush 171, the spindle support member 51 is set at a predetermined angle, and the spindle 52 is moved in the axial direction thereof, thus enabling to perform marking-off operation.

Additionally, in the case of replacing the measuring element 53 by new one as necessary, if it is necessary to change the shape of the forward end of the measuring element 53 only, then only the set-screw 173 is untightened and the measuring element 53 is removed, the measuring element 53 is replaced by one having the required shape, the set-screw 173 is tightened again and fixed, and the succeeding measurement is performed. In this case, if the required shape is provided at the other end of the measuring element 53 being used, then the measuring element 53 should be reversed in direction, inserted and fixed as indicated by solid lines in FIG. 16.

On the other hand, if it is necessary to replace the measuring element 53 by one having a different diameter, then the set-screw 172 should be loosened and remove the measuring element mounting bush 171. Then, a measuring element 530 having a diameter equal to the cylindrical portion 171A of this bush 171 should be directly inserted into the measuring element mounting portion 52A of the spindle 52 and affixed thereto by means of the set-screw 172.

Futhermore, if it is desirable to change the aforesaid small diameter measuring element 53 itself into a direction perpendicular to the axial direction of the spindle 52, then the measuring element 53 is inserted into the second through-hole 171D of the bush 171 and affixed thereto by means of the set-screw 173 as indicated by chain lines in FIG. 16.

The present embodiment described above can offer the following advantages.

Since the supports 41 and 42 are supported by the guide rails 31 and 32, respectively, at the side surfaces of the bedplate 21, the entire upper surface of the bedplate 21 can be formed into an effective measuring area, so that the bedplate 21 formed by an expensive stone surface plate or the like can be rendered small, and moreover, the measuring instrument as a whole can be rendered compact in size, to thereby minimize the installation space. Since there is no obstacle on the upper surface of the bedplate 21, the workpiece 54 to be measured is not restricted when it moves in or out of the bedplate 21, whereby the workpiece 54 being larger than the upper surface of the bedplate 21 can be mounted on the bedplate 21, and the posture of mounting is not restricted. Further, since the whole surface of the bedplate 21 is open, the position of the operator during working is not limited, thus resulting in convenient handling of the measuring instrument. Absence of any obstacle on the bedplate 21 makes it possible to facilitate automatic mounting and removal of the workpiece 54 to be measured. Additionally, the compact overall size permits the measuring instrument to be conveyed with a high convenience. Further, the opposing guide rails 31 and 32 are larger in length than the bedplate 21, so that a larger workpiece 54 can be measured in this respect. However many rollers 62, 63, 64, 66, 67 and so on for movably supporting the supports 41 and 42 on the guide rails 31 and 32 are arranged in longitudinal direction of the guide rails 31 and 32, no adverse effect is rendered to the effective measuring area, and hence, use of these rollers in a relatively large number permits the supports 41 and 42 to be stably supported.

The guide rails 31 and 32 are affixed to the bedplate 21 through the support shaft 25 by the method of bonding, and hence, the guide rails 31 and 32 can be readily and precisely positioned relative to the upper surface of the bedplate 21 by use of a suitable jig or the like, and the measuring element support member 40 can be set as referenced from the positions of these guide rails 31 and 32. In this case, the various portions of the measuring element support member 40, i.e., the portion of the supports 41 and 42, the portion of the slider guide rails 46 and 47, the portion of the slider 49 and the portion of the spindle support member 51 are formed into unitary structures, respectively, and capable of being assembled, individually and all of the adjustments can be effected at the connecting portions 44 and 45, and hence, assemblings may be performed as referenced from one of the both guide rails 31 and 32, i.e., from the guide rail 31 in the present embodiment. In consequence, little question arises about parallelism between the both guide rails 31 and 32 and the like, and hence, the individual rails 31 and 32 should be secured from the upper surface of the bedplate 21 at distances equal to each other, thus enabling to facilitate the assembling works. Furthermore, the guide rails 31 and 32 are positioned at predetermined positions on the support shafts 25 by means of the V-grooves 25D and the locking screws 34 and made detachable, whereby the rails 31 and/or 32 can be readily replaced when the scale 33 is damaged and so forth.

Since the various portions of the measuring element support member 40 are formed into unitary structures as described above, the individual portions can be replaced, e.g., only the support 42 can be replaced. Since it suffices that the both supports 41 and 42 have no curves, telescopic structures of the supports may be adopted so as to extend the scope of measurement. Since the supports 41, 42 and the slider guide rails 46, 47 are connected to each other through the connecting portions 44, 45 having the adjusting means, only the connecting portions 44, 45 should be handled to effect all of the adjustments of the measuring element 53 in the directions of the axes X, Y and Z.

Further, the opposing supports 41 and 42 are connected through the transverse member 43 under a tensile force, so that the structure including the supports 41, 42 and the slider guide rails 46, 47 can be increased in rigidity. In this case, it suffices that the transverse member 43 is disposed upwardly of the upper-most point of elevation of the bottom end portion of the measuring element 53, and hence, the transverse member 43 need not be provided at the top ends of the supports 41 and 42, and may be provided on the intermediate portions of the supports 41 and 42 so that deformation of the spreading directions between the bottom end portions of the supports 41 and 42 can be effectively prevented.

Furthermore, the engageable block 61 and the guide rail 31 are secured to each other without being shifted in position by means of three rollers 62, 63 and 64 including the roller 62 abutted against the rectilinear portion in cross section of the guide rail 31, and hence, if, previously, the scale 33 is secured to the guide rail 31 and the measuring unit 70 is secured to the engageable block 61, then the scale 33 and the index scale 71 of the measuring unit 70 can keep a clearance of a predetermined value therebetween at all times without needing to use complicated fixtures, rotation preventing means and the like. After the support shafts 25 have been affixed to the bedplate 21, even if the screw 34 is loosened and the guide rails 31 and 32 are replaced, the guide rails 31 and 32 can be set at the same positions as before with respect to the bedplate 21, whereby the scale 33 and the like are readily replaceable and necessity for the subsequent adjustment can be eliminated in case the scale 33 is damaged. Further, the surface, on which the rollers 62 are engaged with the guide rail 31, and the groove 31C for mounting the scale 33 are precision-finished with high accuracy, whereby only applying of the scale 33 into the groove 31C enables the surface, on which the rollers 62 are engaged with the guide rail 31, in turn, the index scale 71 and the scale 33 to be kept in parallel to each other, and there are little occurrences of warps, distortions and the like of the scale 33 with respect to the moving direction of the engageable block 61, so that necessity for adjustments can be eliminated, thereby enabling to reduce the number of man-hour in assembling to a considerable extent. As far as the relations between the guide rail 31 and the rollers 62 are not changed, the engageable block 61 and the guide rail 31 can be kept in parallel to each other, and hence, the clearance between the scale 33 and the index scale 71 can be changed or adjusted while the above-mentioned parallelism is being kept. Since the guide rail 31 additionally serves as the fixed block for the scale 33, whereby no special fixture and the like are needed, thus enabling to manufacture at low costs.

Further, the guide rails 31 and 32 are bonded and affixed to the bedplate 21 through the support shafts 25, and hence, an accurate parallelism between the guide rails 31, 32 and the upper surface of the bedplate 21 can be readily obtained, and, even of support points, i.e., the support shafts 25 are increased in number to prevent the guide rails 31 and 32 from being deflected, errors in mounting the support shafts 25 to the guide rails 31 and 32 are entirely absorbed by the portion of the bonding agent 26, whereby no stress occurs in the guide rails 31 and 32. The rollers 62, 63 and 64 abut against the guide rails 31 such that the rollers 62, 63 and 64 are varied in angle from one another through 120° and, on the sides of the bedplate 21, the rollers abut against the circular arcuate portions in cross section of the guide rails obliquely from above and below but not against the side surfaces, and hence, spaces which would otherwise be provided between the guide rail 31 and the bedplate 21 owing to the interposition of the rollers 63 and 64 can be reduced, whereby the projecting values of the support shafts 25 projecting from the side surfaces of the bedplate 21 can be reduced, thus enabling to offer the advantage in the cantilever supporting shapes. Further, the positioning control of the measuring element support member 40 can be effected by only one guide rail 31, so that the construction of engagement between the other guide rail 32 and the measuring element support member 40 can be simplified. Moreover, the accuracy need not be made strict, so that the manufacturing cost may be reduced from the point described above.

Further, while the engageable block 61 is controlled in positioning in the directions of the X and Z axes by use of only one guide rail 31, the engageable block 61 can be guided in the direction of the Y axis, and moreover, the engageable block 61 can be controlled in positioning in the rotating direction as well. Even when the measuring element support member 40 is moved up to the limit of the scope of the movement capacity thereof, the measuring element support member 40 is merely abutted against the shock absorber 90, and hence, no adverse effect is caused to the accuracy in the measurement. Since the shock absorber 90 includes the cylindrical member 91 coupled onto the end portion of the guide rail 31, the compression spring 93 formed by a coil spring can be confined therein, whereby the using space is reduced, thus enabling to render compact in size. Further, the shock absorber 90 has the construction being coupled onto the guide rail 31 as described above, and hence, the guide rail 31 can be projected from the bedplate 21 and the shock absorber 90 can be provided on a position thus projected, so that the effective measuring space on the upper surface of the bedplate 21 will not be reduced.

Further, according to the present embodiment as described above, the measuring elements 53 and 530 different in diameter from each other can be mounted to one and the same spindle 52, and the small diameter measuring element 53 plus the measuring element mounting bush 171 and the large diameter measuring element 530 are substantially equal to each other in weight, so that the load acting on the spindle as being the main body can be made substantially invariable. Further, the change in the insertion positions from the measuring elements 53 to 530 makes it possible to vary the effective length, i.e., the projecting values of the measuring elements 53 and 530. Furthermore, the measuring element 53 can be changed in its direction, and, since the spindle support member 51 is rotatable relative to the slider 49, the marking-off works in the inclined directions can be facilitated.

Since the probes 53A and 53B being different in shape from each other are formed on the opposite ends of the measuring element 53, the scope of application may be widened.

Since adjustment in accuracy of the measuring element 53 is effected by use of the measuring element 53 itself after the overall construction has been assembled, high accuracy can be attained. Moreover, the adjustment is effected only by the connecting portions 44 and 45, whereby high skill level is not required for assembling, and assembling can be completed in a short period of time. Further, adjustments are effected after the assembling has been completed, so that sharp reduction in costs can be made, with the accuracy being secured, due to the decrease in number of high class finish parts, easy adjustments and so forth, and transportation performance can be improved because adjustments due to transportation can be easily made.

Since two slider guide rails 46 and 47 are provided, shifted in their positions from each other in the longitudinal direction (direction of the Y axis) and the rear surface of the upper rail 46 supports the scale 145, the slider 49 can be easily locked against rotation. For protection of the scale 145, it is desirable that the scale 145 is secured at least in the vertical direction or downward direction. In this respect, according to the present embodiment, in the upper rail 46, the scale 145 is secured in the vertical direction, placing stress on the support of the scale, while, the lower rail 47 can bear the load in the vertical direction. Further, shifting of the rails 46 and 47 from each other in the longitudinal direction makes it possible to reduce the dimension in the direction of height can be reduced.

The both supports 41 and 42 are completely separately formed but not integrally fixed by means of welding, etc. as in the prior art, and one support 41 is secured to the guide rail 31, which has been accurately positioned, by means of three rollers 62, 63 and 64 in a manner unmovable in the direction of the X axis, and, for the other support 42, the distance across the both supports 41 and 42 is determined by use of the transverse member 43, so that the slider guide rails 46 and 47 for guiding the slider 49 can be adjustably secured to the supports 41 and 42, thereby enabling to facilitate the assembling works. One rail 31 is used as the positional reference, and hence, it suffices that the other rail 32 is in parallel to the upper surface of the bedplate 21, high accuracy is not required for mounting of the rail 32, and, also in this respect, the assembling works are facilitated. In this case, the rollers 66 and 67 of the support 42 can be effectively prevented from falling off the rail 32 owing to the transverse member 43. Further, it suffices that the both supports 41 and 42 are stationary below the transverse member 43, and the lengths and the like of the supports above the transverse member 43 do not count, and adjustments may be made by use of the connecting portions 44 and 45 at last, so that the both supports 41 and 42 may have constructions capable of telescopically extending above the transverse member 43.

Further, the spindle support member 51 can be inclined with respect to the slider 49, i.e., the so-called Z axis spindle 52 can be inclined, so that a diameter, depth and the like of a hole in the workpiece 454 having the hole 454B in the inclined surface 454A can be readily and one-dimensionally measured, thereby enabling to add a so-called contour measuring instrument-like function. Furthermore, in measuring this inclined surface 454A and the like, there is no need for inclining the workpiece 454 to be measured, and, also in this respect, the measurement can be simplified. Furthermore, the adoption of a measuring element 553, a test indicator 653, a marking-off pin 753 or the like, all of which have suitable shapes, makes it possible to perform the works in the various directions of inclination in addition to the ordinary measurement. In this case, if the workpiece 54 to be measured is mounted on the bedplate 21 through a rotary table, then the inclinations and the like of the various surfaces of the workpiece 54 can be easily measured.

Further, the guide rails 31 and 32 of the measuring element support member 40 are provided at the sides of the bedplate 21, no obstacle is found on the bedplate 21, and the spindle support member 51 is tiltable, so that even the workpiece 54 projecting from the sides of the bedplate 21 can be measured, thus enabling to expand the scope of measurement.

Furthermore, the constant load spring 162 is stretched across the spindle support member 51 and the spindle 52, so that the spindle 52 can be operated by a force of a very small value. This constant load spring 162 is drawn out, as the spindle 52 is withdrawn, and covers the surface of the scale 161, so that the spring 162 can effectively render the surface protection to a downwardly projecting portion of the scale 161 which is easily brought into contact with the workpiece 54 and other articles.

Further, the angle of inclination of the spindle support member 51 can be read by use of the angle measuring means 50 and precisely measured through the agency of the main scale 156 and the auxiliary scale 157. To return the spindle support member 51 to the vertical direction, i.e., to the original point, this returning can be effected by use of this angle measuring means 50 and also by use of the positioning device 210, which can perform the returning operation to the original point quickly and accurately.

Further, an inversion of the spindle support member 51 by rotating it through 180° makes it possible to measure a point to be measure located at a high position, however, this is a somewhat particular use.

Positioning of the engageable shaft 213 as being the first member and the engageable bush 214 as being the second member is effected in a condition where the both members are connected to each other, so that the slider 49 and the spindle support member 51 can return to the original points (zero points) within the accuracies of 1 $\mu$m. These accuracies are very high as compared with those of 30 $\mu$m order in the prior art, and yet, are obtained through the operation at high speed. Furthermore, the engageable shaft 213 and the engageable bush 214 are connected to each other not only through the engagement between the taper shaft 213B and the tapered hole 214B but also through the threadable coupling between the external threads 213A and the internally threaded screw 214A, whereby no deflections are caused to the slider 49 and the spindle support member 51 due to a force of an excessively high value applied by the engageable shaft 213 in the axial direction thereof, thus enabling to maintain the high accuracies in the measurement. Further, only the returning force of the compression coil spring 217 as being the releasing means is applied to the engageable shaft 213, whereby no tensile force which may deform the slider 49 or the like is generated in the engageable shaft 213.

Furthermore, the tapered hole 214B additionally serves as a guide for the external threads 213A in the engagement operation, so that the engagement operation can be facilitated. Since the engageable shaft 213 and the engageable bush 214 are threadably coupled to each other, the tapered connecting portions are not loosened even if a force is applied to the stationary side of the bush 214. Further, the provision of the positioning control means 220 on the engageable shaft 213 makes it possible to maintain the accuracies and eliminate a possibility of occurrence of loosening of the engageable shaft 213 due to looseness which would otherwise be caused to the engageable shaft 213.

Further, the engageable bush 214 of the positioning device 210 is solidly secured by bonding, whereby necessity for center-aligning and the like between the positioning device 210 and the various structures such as the slider 49 or the spindle support member 51 is eliminated, so that the manufacture can be facilitated. Furthermore, accuracy of finishing of the mounting portions of the structures to the positioning device 210 is not needed, so that the manufacture can be facilitated in this respect as well.

Additionally, the provision of the compression coil spring 217 as being the releasing means on the engageable shaft 213 makes it possible that the engageable shaft 213 does not interfere with the spindle support member 51 to hinder the operation when the engageable shaft 213 is released.

The fine feed device 80 comprises an inverted C-shaped frame 81 secured to the engageable block 61 through the control shaft 82 as being the fine feed means in a manner to be rotatable and movable relative to the guide rail 31 in the longitudinal direction thereof, a clamp screw 87 secured to this frame 81 through the oscillating block 85 and the like, and constituted by simple parts, without using high class parts such as a split nut and a bearing, so that the fine feed device 80 can be produced at a low cost and the operation thereof can be facilitated. Furthermore, the guide rail 31 is clamped at two points, i.e., in one radial direction and a direction opposite thereto, no deflection occurs in the guide rail 31 unlike in the case where the guide rail is urged in one direction only. In consequence, the engageable block 61 can keep moving smoothly and no adverse effect is rendered to the accuracy in measuring. Further, the portion clamped by the clamp screw 87 and the crossbar 81B differs from the position, against which the rollers 62, 63 and 64 abut, whereby no adverse effect is rendered to the movement of the engageable block 61 even if deformation is caused to the clamped portion.

Furthermore, the U-shaped spring 88 as being the biasing means is confined between the frame 81 and the fulcrum shaft 89 for returning supported by the engageable block 61, whereby the frame 81 and the clamp screw 87 are completely disengaged from the guide rail 31 when the clamp screw 87 is operated for releasing, so that the movement of the engageable block 61 will not be hindered. Further, the bedplate 21 is formed of the stone surface plate, so that the measurement with high accuracy can be maintained.

Figure 25:
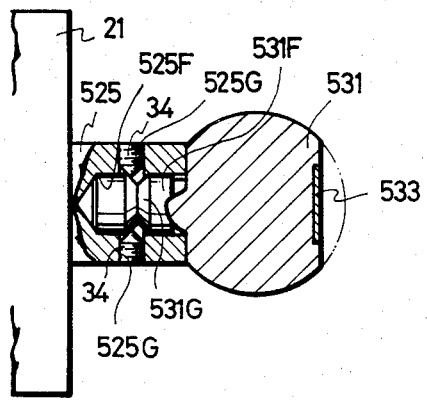
FIG. 25 is a sectional view showing another embodiment of the guide rail portion in the present invention.

FIG. 25 shows another embodiment of the present invention. In this embodiment, a projection 531F is provided on the guide rail 531, a V-groove 531G is provided on this projection 531F, while, a recess 525F engageable with the projection 531F is formed on the support shaft 525, a threaded hole 525G extending to this recess 525F is formed in the vertical direction, the center axis of the threaded hole 525G and the center of the V-groove 531G are shifted from each other when the projection 531F is engaged with the recess 525F, and the end face of the support shaft 525 and the rectilinear portion in cross section of the guide rail 531 are abutted against each other.

Even the present embodiment with the above-described arrangement has the functional effects similar to the preceding embodiment.

Figure 26:
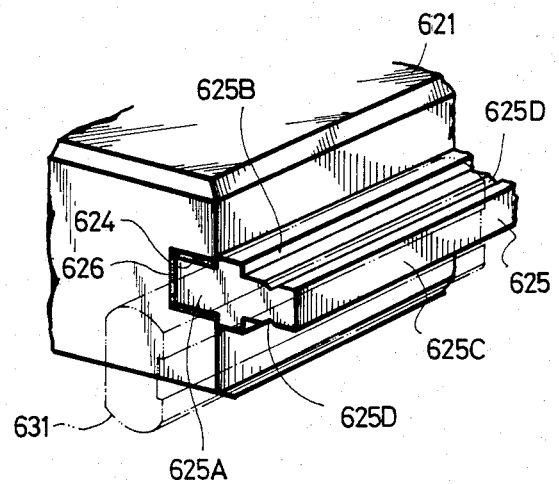
FIG. 26 is a perspective view a further embodiment thereof.

FIG. 26 shows a further embodiment of the present invention. In this embodiment, a rail-shaped support member 625 but not the shaft-shaped member is used as the rail support member, a small width portion 625A is formed at the proximal end of this support member 625, and this small width portion 625A is inserted and affixed through a bonding agent 626 into a groove 621A formed at one side surface of a bedplate 621. A prismatic ridge 625C is integrally formed through a stepped portion 625B on the forward end of the support member 625, and V-grooves 625D are formed on the upper and under surfaces of this ridge 625C. A guide rail 631, being positioned through the agency of the V-groove 625D and a locking screw, not shown, is detachably secured to the ridge 625C in the same manner as in the preceding embodiments.

Even the present embodiment with the above-described arrangement has the functional effects similar to the preceding embodiments.

Figure 27:
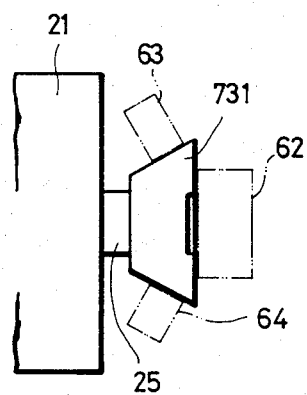
FIG. 27 is a still further embodiment thereof.

FIG. 27 shows a still further embodiment of the present invention. In this embodiment, the guide rail 731 is formed into a trapezoidal shape in cross section, eliminating the circular arcuate portions, other respects in construction are similar to those in the embodiment shown in FIG. 3, and also, the function and effects are similar thereto.

Figure 28:
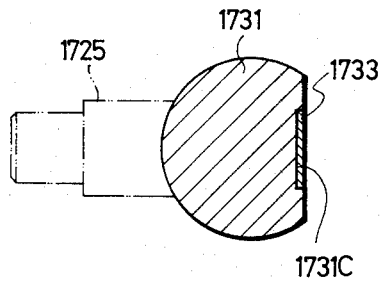
FIG. 28 is a yet further embodiment thereof.

FIG. 28 shows the essential portions of a yet further embodiment of the present invention, in which the guide rails 1731 disposed in the direction of the Y axis are each provided in the cross section perpendicular to the axis with only one rectilinear portion, and this rectilinear portion is formed with a groove 1731C along the axial direction of the shaft member 1731 (longitudinal direction) and in parallel to the rectilinear portion.

In practical use, the shaft member 1731 with the above-described arrangement is secured to the bedplate 21 shown in FIG. 3 or the like through a suitable support shaft 1725 indicated by two-dot chain lines in FIG. 28, supported at opposite ends thereof like the slider guide rail 46 shown above in FIG. 3, or the shaft member 1731 itself slides like the spindle 52 shown in FIG. 3.

Even the present embodiment with the above-described arrangement has the functional effects similar to the preceding embodiments.

Figure 29:
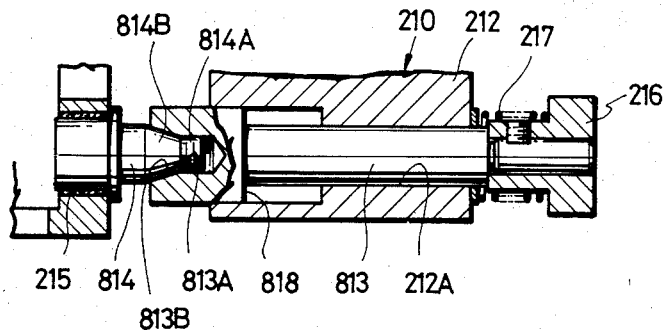
FIGS. 29 and 30 are enlarged sectional views of other embodiments of the positioning device portion according to the present invention, differing from each other.
Figure 30:
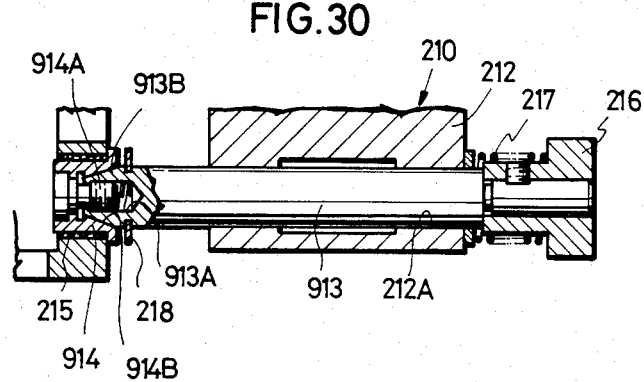

FIGS. 29 and 30 show further embodiments of the present invention, being different from each other in the relations of the threadable couplings between the threaded portions and the tapered portions. Here, same reference numerals as shown in the preceding embodiments are used throughout the figures in the present embodiment to designate same or similar parts, so that detailed description will be omitted.

More specifically, in the embodiment shown in FIG. 29, internal threads 813A and a tapered hole 813B are provided on an engageable shaft 813, external threads 814A and a taper shaft 814B are provided on a projecting shaft 814 corresponding to the aforesaid engageable bush, and a stopper 818 is formed by a large diameter portion of the engageable shaft 813.

Even the present embodiment with the above-described arrangement has the functional effects similar to the preceding embodiments as far as the projecting shaft 814 is solidly secured by means of the bonding agent 215 in the positioned condition.

In the embodiment shown in FIG. 30, internal threads 913A and a taper shaft 913B are provided on an engageable shaft 913 and external threads 914A and a tapered hole 914B are provided on an engageable bush 914.

Even the present arrangement with the above-described arrangement has the functional effects similar to the preceding embodiments as far as the engageable bush 914 is positioned and fixed by means of the bonding agent 215.

In addition, in the preceding embodiment, the measuring element 53 having a contact type construction has been illustrated, however, the measuring element according to the present invention need not necessarily be limited to this specific form, but, may be replaced by those including one using a electrostatic capacity, or a so-called non-contact type one such as a laser measuring instrument for length. Further, in the preceding embodiment, as for the supports 41 and 42, one support at each side has been provided, however, the supports may be increased in number, and two or more supports may be provided at each side, or the guide rails 31 and 32 as being a shaft member may be increased in number, and two or more rails may be provided at one side as shown in slider guide rails 46 and 47 illustrated in FIG. 3. Here, one out of these guide rails 31 and 32 may be used as a reference, and the other used to bear the load of the measuring element support member 40. With the above-described arrangement, the accuracy in the measurement can be maintained for a long period of time. Further, the shapes of the guide rails 31, 531, 631 and 731 need not necessarily be limited to ones having rectilinear portions in cross section (planar portion) at the opposite sides thereof, but, may be replaced by one having no rectilinear portion in cross section on the right side as indicated by two-dot chain lines in the right of FIG. 25, that is, it suffices that at least one side has a rectilinear portion, against which at least one roller is abutted. However, the provision of two rectilinear portions makes it possible to conveniently use them as one for guiding the rollers, another for a reference in applying a scale and so forth.

The both guide rails 31 and 32 in the first embodiment need not necessarily be limited to the specific form in which the rails are provided at the sides of the bedplate 21 and downwardly of the bedplate 21. For example, the rails may be provided on the upper surface of the bedplate 21 directly or through a seat plate, and otherwise, no rail is provided at the side where there has been provided a rail being not referenced from, and the upper surface of the bedplate itself may be used for guiding. In short, it suffices that a guide rail, which can be referenced from, is provided at one side of the bedplate 21. Further, the scales 33 and 161 need not necessarily be limited to the optical reflection type scale, but, may be replaced by a light transmission type scale, an electromagnetic scale, a magnetic scale, an electrostatic capacity type scale and a contact point scale. Needless to say, along with the changes in types as described above, the measuring unit 70 should be changed accordingly.

The movable member of the shock absorber 90 need not necessarily be a cylindrical member 91, but, may be one having any shape such as a plain plate shape. Furthermore, the shock absorbing means need not necessarily be the compression spring 93 formed of the coil spring, but, may be a sheet spring, rubber or any other members. Further, the guide rails 31 and 32 need not necessarily be ones projecting from the side surfaces of the bedplate 21, but, may be ones projecting sideways from above the upper surface of the bedplate 21. However, ones projecting from the side surfaces of the bedplate 21 has the advantages as described above.

Figure 31:
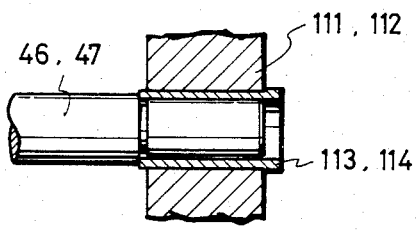
FIG. 31 is a sectional view of the essential portions showing another embodiment of the mounting construction of the slider guide rail according to the present invention.

Further, the provision of the measuring element mounting bushes 171 of several types differing inner diameter from one another makes it possible to meet more requirements. Furthermore, the through-holes 171B and 171D in the bush 171 need not necessarily be limited to two, but one throughhole, or three or more may be used, provided that at least one should be aligned with the axis of the spindle 52. Furthermore, the measuring elements 53 and 530 need not necessarily be limited to ones, the diameters of which are equal to each other over the total lengths, but, may be ones having portions larger than the inner diameters of the through-holes 171B and 171D of the bush 171 or the mounting portions 52A of the spindle 52. In this case, portions of these measuring elements should have diameters capable of being inserted into the through-holes and the mounting portions. Additionally, one of the connecting portions 44 and 45 may lack the adjusting means. Further, the detection of the displacement value in the directions of the X, Y and Z axes need not necessarily be made by the optical detectors as in the preceding embodiments, but may be made by other detectors including a magnetic, an electromagnetic, a laser detectors. Furthermore, in the preceding embodiment, description has been given of that both the connecting blocks 111, 112 and the slider guide rails 46, 47 are made by fixing by use of bolts 117, 118. However, in working, either the connecting blocks 111, 112 or the slider guide rails 46, 47 may not be bolted and be allowed to move in the axial direction as shown in FIG. 31. In this case, the connecting portions having the construction shown in FIG. 31 need not necessarily be provided with the adjusting means. Further, in the preceding embodiments, the engageable shafts 213, 813 and 913 are called the first members and the engageable bushes (projecting shafts) 214, 814 and 914 are called the second members. However, these members are called so for the convenience's sake, but, need not be substantially limited so. Therefore, the engageable shafts 213, 813 and 913 may be called the second members and the engageable bushes (projecting shafts) 214, 814 and 914 may be called the first members. Furthermore, either the first or the second member, for example, the second member, i.e., engageable bush 214, 814 or 914 is increased in number and those bushes are affixed to a plurality of positions on the spindle support member 51. If these affixed positions of the engageable bushes 214, 814 or 914 are set at such positions that, when the engageable shaft 213, 813 or 913 is engaged with one of these engageable bushes 214, 814 or 914, the spindle support member 51 can be inclined at a predetermined angle, then, the engageable shaft 213, 813 or 913 can be readily, angularly set at a desirable one position out of the plurality of the aforesaid positions.

Furthermore, in the preceding embodiment, the bush is made stationary and the shaft is made movable, however, this order may be reversed. In short, it suffcies that either one is movable and the other is made stationary, and the stationary one should be positioned and fixed in a condition where this stationary one is connected to the movable one with each other. In this case, the fixing means need not necessarily be limited to bonding, and bolting may be satisfactory. However, connection through bonding makes it possible to make the works easy, reliable, and the extent of aging is low.

Further, the releasing means need not necessarily be limited to the compression coil spring 217, but may be replaced by other mechanisms. For example, a so-called bayonet type engaging mechanism may be provided between the engageable shaft 213 and the bearing member 212.

As the fine feed means, the control shaft 82 having the fine threads 82A has been described, however, the present invention need not necessarily be limited to this. For example, this may be replaced by one constituted by a rack and a pinion through a reduction gear and the pinion is rotated to cause the rack provided on a frame 81 to move along a guide rail 31, or may be replaced by any other construction. Furthermore, the clamp member need not necessarily be the screw such as the clamp screw 87, but may be replaced by an eccentric cam. In short, it suffices that any one which can linearly move to the guide rail 31 and can clamp the guide rail 31 with the crossbar 81B. Further, the biasing means need not necessraily be the U-shaped spring 88 formed of the sheet spring, but, may be replaced any one such for example as a tensile spring stretched between the lower crossbar 81B and the bottom portion of the engageable block 61, a compression spring confined between the upper crossbar 81B and the ceiling portion of the engageable block 61, or a torsion coil spring having the control shaft 82 as a fulcrum. The spring type need not necessarily be limited to the sheet spring, but, may be replaced by a coil spring, a formed wire or the like. Or otherwise, this need not necessarily be limited to the spring, but may be replaced by rubber or a weight affixed to the forward end of the crossbar 81B. In these cases, the provision of a stopper for regulating the rotary angle of the frame 81 due to biasing means on the engageable block 61 should be more effective.

What is claimed is:

1. A coordinate measuring instrument comprising:
   a bedplate for mounting thereon a workpiece to be measured, directions with respect to said bedplate being definable by mutually intersecting X and Y and Z axes fixedly oriented with respect to said bedplate;
   a pair of guide rails located to flank opposite sides of said bedplate, which sides extend in:the direction of the Y axis, said guide rails each having means inserted into and supported by openings provided in opposite side surfaces of said bedplate and by which said guide rails are aligned in the direction of the Y axis, the upper surface of at least one said guide rail being parallel to the upper surface of said bedplate;
   a measuring element support member including a pair of supports guided along said guide rails, a slider guide rail racked across the upper end portions of said supports, a slider slidable along said slider guide rail in the direction of the X axis, and a spindle movably supported in said slider in the direction of the Z axis;
   a measuring element mounted on one end of said spindle; and
   detectors for detecting displacement values of said measuring element in the directions of the X, Y and Z axes.

2. A coordinate measuring instrument as set forth in claim 1, wherein cross-sectional shape of at least one said guide rail, taken in a plane perpendicularly intersecting the axial direction of said guide rail, is divided into two types of portions including circular arcuate portions and rectilinear portions, said one guide rail and said measuring element support member are engaged with each other through a set of three rollers secured to said measuring element support member, said three rollers are angularly spaced apart from one another through 120°, and at least one of said rollers is brought into abutting contact with a rectilinear portion in the cross-section of said one guide rail.

3. A coordinate measuring instrument as set forth in claim 1, wherein a scale of said Y axis direction displacement detector is secured to a said guide rail, said scale being reflective, said Y axis detector including a side-by-side light emitting element and light receiving element fixed with respect to said supports and spaced along said scale and convergently aimed at an opposing portion of said reflective scale for reflection of light from said light emitting element by said reflective scale to said light receiving element.

4. A coordinate measuring instrument as set forth in claim 1, wherein a said guide rail is affixed by bonding to said bedplate.

5. A coordinate measuring instrument as set forth in claim 1, wherein at least one said guide rail has shock absorbers provided on the opposite ends thereof, and each of said shock absorbers includes a movable member movably provided on said one guide rail and shock absorbing means interposed between said movable member and said one guide rail.

6. A coordinate measuring instrument as set forth in claim 1, including a bush for mounting the measuring element, said bush having a cylindrical portion and being provided on said spindle in a manner to be attachable and detchable in the axial direction of said spindle, said bush being formed with a plurality of through-holes, the axes of which perpendicularly intersect one another.

7. A coordinate measuring instrument comprising:
   a bedplate;
   a measuring element;
   a measuring element support member for supporting said measuring element for displacement with respect to the upper surface of said bedplate along mutually perpendicularly intersecting X, Y and Z axes;
   an X axis direction displacement detector, a Y axis direction displacement detector and a Z axis direction displacement detector for respectively detecting displacements of said measuring element in the directions of the X, Y and Z axes;
   guide rails for guiding said measuring element support member in the direction of the Y axis, at least one of said guide rails projecting from a side surface of said bedplate and the upper surface of said one guide rail being in parallel to the upper surface of said bedplate said measuring element support member including a pair of supports, two slider guide rails parallel to each other and racked across said supports, a slider slidable along said slider guide rails in the direction of the X axis, and a measuring element supported by said slider in a manner to be movable in the direction of the Z axis; and adjusting means for making said measuring element displaceable in the direction of the X, Y and Z axes at connecting portions between the slider guide rails and at least one of said pair of supports.

8. A coordinate measuring instrument as set forth in claim 7, including a transverse member and means affixing same to said pair of supports for setting an interval across said pair of supports in the direction of the X axis to a predetermined length, and said transverse member is disposed upwardly of an upper limit position of movement of the bottom end of said measuring element.

9. A coordinate measuring instrument as set forth in claim 7, wherein said slider guide rails are racked at opposite ends thereof across said pair of supports and including means under tensile force rendered in the axial direction of said slider guide rails for connecting said pair of supports.

10. A coordinate measuring instrument as set forth in claim 7, wherein said slider guide rails are affixed at corresponding one ends thereof to one of said supports and supported the other ends thereof by the other pport for displacement in the axial direction thereof.

11. A coordinate measuring instrument comprising:
a bedplate;
a measuring element;
a measuring element support member for supporting said measuring element for displacement with respect to the upper surface of said bedplate along mutually perpendicularly intersecting X, Y and Z axes;
an X axis direction displacement detector, a Y axis direction displacement detector and a Z axis direction displacement detector for respectively detecting displacements of said measuring element in the directions of the X, Y and Z axes;
guide rails for guiding said measuring element support member in the direction of the Y axis, at least one of said guide rails projecting from a side surface of said bedplate, the upper surface of said one guide rail being parallel to said bedplate, said measuring element support member being provided with a slider movable in the direction of the X axis, said slider supporting a spindle support member in turn supporting a spindle for movement in the axial direction of the spindle, said spindle supporting said measuring element, said spindle support member being mounted on said slider for rotation about an axis perpendicular to the direction of movement of said slider and the direction of movement of said spindle.

12. A coordinate measuring instrument as set forth in claim 11, wherein said slider is provided with a fine adjusting means for finely adjusting the rotational angle of said spindle support member.

13. A coordinate measuring instrument as set forth in claim 11, including angle measuring means for measuring an inclination of said spindle support member and provided between said spindle support member and said slider.

14. A coordinate measuring instrument as set forth in claim 11, including a first member having a threaded portion and a tapered portion, both of which are provided on the same axial line, and a second member having a threaded portion and a tapered portion meeting said threaded portion and said tapered portion of the first member, one of said first and second members being movable along said axial line, along which the first and second members are engaged with each other, one of said first and second members is secured to said slider and the other is secured to said spindle support member, and releasing means for separating said first and second members from each other and provided on one of said slider and spindle support member.

15. A coordinate measuring instrument as set forth in claim 14, wherein said first member comprises an engageable shaft provided at the forward end thereof with an externally threaded portion and a tapered shaft, said second member comprises a bush having an internally threaded portion capable of being threadably coupling to said externally threaded portion and a tapered hole engageable with said tapered shaft, and said engageable shaft is slidably inserted into a bearing member and secured to one of said slider and spindle support member through said bearing member.

16. A coordinate measuring instrument as set forth in claim 15, wherein said bush is affixed to one of said slider and spindle support member through a bonding agent.

17. A coordinate measuring instrument comprising:
a bedplate;
a measuring element;
a measuring element support member for supporting said measuring element for displacement with respect to the upper surface of said bedplate along mutually perpendicularly intersecting X, Y and Z axes;
an X axis direction displacement detector, and Y axis direction displacement detector and a Z axis direction displacement detector for respectively detecting displacements of said measuring element in the directions of the X, Y and Z axes;
guide rails for guiding said measuring element support member in the direction of the Y axis, at least one of said guide rails projecting from a side surface of said bedplate, the upper surface of said one guide rail being parallel to said bedplate; and
a fine feed device on said measuring element support member for finely feeding said measuring element support member relative to one said guide rail, said fine feed device including clamp means actuable to releasably clamp said guide rail and fine feed means connecting said measuring element support member to said clamp means and rotatable to finely adjust the former along said guide rail with said clamp means clamping said guide rail.

18. A coordinate measuring instrument as set forth in claim 17, wherein said fine feed device comprises:
an engageable block movably supported on said guide rail and fixed with respect to said measuring element support member;
said clamp means including a frame secured to said engageable block by said fine feed means, said fine feed means being rotatable for movement of said frame relative to said guide rail in the longitudinal direction of said guide rail, said frame having two crossbars opposed to said guide rail to radially clamp said guide rail;
an oscillating block secured to one of said crossbars of the frame at a position opposed to said guide rail;
a clamp member linearly movable on said oscillating block toward said guide rail and adapted to clamp said guide rail in cooperation with the other of said crossbars when said oscillating block is moved out;
an biasing means for separating the other of said crossbars from said guide rail when said clamp member is retracted.

* * * * *

UNITED STATES PATENT AND TRADEMARK OFFICE
CERTIFICATE OF CORRECTION

PATENT NO. : 4 495 703

DATED : January 29, 1985

INVENTOR(S) : Hideo SAKATA and Masami SAITO

It is certified that error appears in the above-identified patent and that said Letters Patent is hereby corrected as shown below:

Column 35, line 25; change "pport" to ---support---.

Column 35, line 25; after "supported" insert ---at---.

Column 36, line 12; change "coupling" to ---coupled---.

Signed and Sealed this

Twenty-seventh Day of August 1985

[SEAL]

Attest:

DONALD J. QUIGG

Attesting Officer

Acting Commissioner of Patents and Trademarks